(12) United States Patent
Arbabi et al.

(10) Patent No.: US 9,739,918 B2
(45) Date of Patent: Aug. 22, 2017

(54) SIMULTANEOUS POLARIZATION AND WAVEFRONT CONTROL USING A PLANAR DEVICE

(71) Applicant: CALIFORNIA INSTITUTE OF TECHNOLOGY, Pasadena, CA (US)

(72) Inventors: Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 2 days.

(21) Appl. No.: 14/852,450

(22) Filed: Sep. 11, 2015

(65) Prior Publication Data

US 2016/0077261 A1    Mar. 17, 2016

Related U.S. Application Data

(60) Provisional application No. 62/050,641, filed on Sep. 15, 2014.

(51) Int. Cl.
*G02B 5/30*    (2006.01)
*G02B 5/02*    (2006.01)

(52) U.S. Cl.
CPC .......... *G02B 5/3025* (2013.01); *G02B 5/021* (2013.01); *G02B 5/0215* (2013.01); *G02B 5/0278* (2013.01); *G02B 5/3083* (2013.01)

(58) Field of Classification Search
CPC .... G02B 1/08; G02B 5/18; G02B 2005/1804; G02B 5/1809; G02B 5/1833; G02B 5/1866; G02B 5/1871; G02B 5/30; G02B 5/3033; G02B 5/3083

USPC .......... 359/483.01, 486.01, 486.02, 486.03, 359/489.01, 489.06, 493.01, 558, 566, 359/569, 574, 575, 576
See application file for complete search history.

(56) References Cited

U.S. PATENT DOCUMENTS

| | | | |
|---|---|---|---|
| 7,408,712 B2 * | 8/2008 | Ruoff | G03F 7/70566 359/489.06 |
| 2007/0019306 A1 | 1/2007 | Wu et al. | |
| 2007/0229955 A1 * | 10/2007 | Kawamura | G02B 5/1809 359/569 |
| 2008/0161194 A1 | 7/2008 | Turner et al. | |
| 2009/0250110 A1 | 10/2009 | Yu et al. | |
| 2012/0082863 A1 | 4/2012 | Ohta et al. | |

(Continued)

FOREIGN PATENT DOCUMENTS

JP    2012078541 A    4/2012

OTHER PUBLICATIONS

Astilean, S. et al., *High-efficiency subwavelength diffractive element patterned in a high-refractive-index material for 633 nm*. Optics Letters, 1998. 23: p. 552.

(Continued)

*Primary Examiner* — Arnel C Lavarias
(74) *Attorney, Agent, or Firm* — Steinfl + Bruno LLP

(57) ABSTRACT

Methods and device for controlling optical scattering are disclosed. An array of 4-fold asymmetric cylinders can act as optical elements scattering electromagnetic waves, where the orientation and dimension of each optical element is determined according to the desired polarization and phase shift response of the device. A Jones matrix can be calculated to determine the fabrication parameters of the optical elements.

21 Claims, 20 Drawing Sheets

(56) References Cited

U.S. PATENT DOCUMENTS

| | | | |
|---|---|---|---|
| 2012/0092770 A1* | 4/2012 | Li | G02B 5/1809 359/572 |
| 2012/0194912 A1* | 8/2012 | Faraon | G02B 5/1809 359/573 |
| 2014/0146390 A1 | 5/2014 | Kaempfe et al. | |
| 2016/0025914 A1* | 1/2016 | Brongersma | G02B 1/002 359/489.07 |

OTHER PUBLICATIONS

Warren, M.E., et al., *High-efficiency subwavelength diffractive optical element in GaAs for 975 nm.* Optics Letters, 1995. 20: p. 1441.
Vo, S., et al., *Sub-wavelength Grating Lenses with a Twist.* IEEE Photonics Technology Letters, 2014. 26: p. 1-1.
Flanders, D.C., *Submicrometer periodicity gratings as artificial anisotropic dielectrics.* Applied Physics Letters, 1983. 42: p. 492.
Mutlu, M., et al., *Experimental realization of a high-contrast grating based broadband quarter-wave plate.* Optics express, 2012. 20: p. 27966-73.
Yu, N., et al., *A broadband, background-free quarter-wave plate based on plasmonic metasurfaces.* Nano letters, 2012. 12: p. 6328-33.
Kildishev, A. V. et al. *Planar photonics with metasurfaces.* Science 339, 1232009 (2013).
Yu, N. et al. *Flat optics with designer metasurfaces.* Nature Mater. 13, 139-150 (2014).
Yu, N. et al. *Light propagation with phase discontinuities: generalized laws of reflection and refraction.* Science 334, 333-337 (2011).
Lin, D. et al. *Dielectric gradient metasurface optical elements.* Science 345, 298-302 (2014).
Lin, J. et al. *Nanostructured holograms for broadband manipulation of vector beams.* Nano Lett. 13, 4269-4274 (2013).
Monticone, F et al. *Full control of nanoscale optical transmission with a composite metascreen.* Phys. Rev. Lett. 110, 203903 (2013).
Arbabi, A. et al. *Fundamental limits of ultrathin metasurfaces.* Preprint at http://arXiv.org/abs/1411.2537 (2014).
Aieta, F. et al. *Aberration free ultrathin flat lenses and axicons at telecom wavelengths based on plasmonic metasurfaces.* Nano Lett. 12, 4932-4936 (2012).
Pfeiffer, C et al. *Cascaded metasurfaces for complete phase and polarization control.* Appl. Phys. Lett. 102, 231116 (2013).
Fattal, D. et al. *Flat dielectric grating reflectors with focusing abilities.* Nature Photon. 4, 466-470 (2010).
Lu, F. et al. *Planar high-numerical-aperture low-loss focusing reflectors and lenses using subwavelength high contrast gratings.* Opt. Express 18, 12606-12614 (2010).
Klemm, A. B. et al. *Experimental high numerical aperture focusing with high contrast gratings.* Opt. Lett. 38, 3410-3413 (2013).
Aieta, F. et al. *Multiwavelength achromatic metasurfaces by dispersive phase compensation.* Science 347, 1342-1345 (2015).
Lalanne, P. et al. *Design and fabrication of blazed binary diffractive elements with sampling periods smaller than the structural cutoff.* J. Opt. Soc. Am. A 16, 1143-1156 (1999).
Arbabi, A. et al. *Controlling the phase front of optical fiber beams using high contrast metastructures.* OSA Technical Digest, STu3M.4 (Optical Society of America, 2014).
Arbabi, A. et al. *Subwavelength-thick lenses with high numerical apertures and large efficiency based on high contrast transmitarrays.* Nature Commun. 6, 7069 (2015).
West, P. R. et al. *All-dielectric subwavelength metasurface focusing lens.* Opt. Express 22, 26212 (2014).
Decker, M. et al. *High-efficiency dielectric Huygens surfaces.* Adv. Opt. Mater. 3, 813-820 (2015).
Kikuta, H. et al. *Achromatic quarter-wave plates using the dispersion of form birefringence.* Appl. Opt. 36, 1566-1572 (1997).
Schonbrun, E. et al. *Reconfigurable imaging systems using elliptical nanowires.* Nano Lett. 11, 4299-4303 (2011).
Yang, Y. et al. *Dielectric meta-reflectarray for broadband linear polarization conversion and optical vortex generation.* Nano Lett. 14, 1394-1399 (2014).
Zhao, Y. et al. *Twisted optical metamaterials for planarized ultrathin broadband circular polarizers.* Nature Commun. 3, 870 (2012).
Garcia-Etxarri, A. et al. *Strong magnetic response of submicron silicon particles in the infrared.* Opt. Express 19, 4815-4826 (2011).
Evlyukhin, A. B. et al. *Multipole light scattering by nonspherical nanoparticles in the discrete dipole approximation.* Phys. Rev. B 84, 235429 (2011).
Spinelli, P. et al. *Broadband omnidirectional antireflection coating based on subwavelength surface Mie resonators.* Nature Commun 3, 692 (2012).
Zhan, Q. *Cylindrical vector beams: from mathematical concepts to applications.* Adv. Opt. Photon. 1, 1-57 (2009).
Phelan, C. F. et al. *Generation of a radially polarized light beam using internal conical diffraction.* Opt. Express 19, 21793-21802 (2011).
Kozawa, Y. et al. *Generation of a radially polarized laser beam by use of a conical Brewster prism.* Opt. Lett. 30, 3063 (2005).
Swanson, G. J. *Binary optics technology: the theory and design of multi-level diffractive optical elements.* Technical Report 845 (Massachusetts Institute of Technology, DTIC, 1989).
Liu, V. et al. *S4: a free electromagnetic solver for layered periodic structures.* Comput. Phys. Commun. 183, 2233-2244 (2012).
Arbabi et al. *Dielectric metasurfaces for complete control of phase and polarization with subwavelength spatial resolution and high transmission. + Supplementary Information.* Nature Nanotechnology (2015) doi:10.1038/nnano 2015.186.
International Search Report and Written Opinion for PCT/US2015/049837 filed Sep. 11, 2015 on behalf of California Institute of Technology. Mail Date: Jan. 11, 2016. 13 pages.
International Preliminary Report on Patentability for PCT/US2015/049837 filed Sep. 11, 2015 on behalf of California Institute of Technology. Mail Date: Mar. 21, 2017. 7 pages.

* cited by examiner

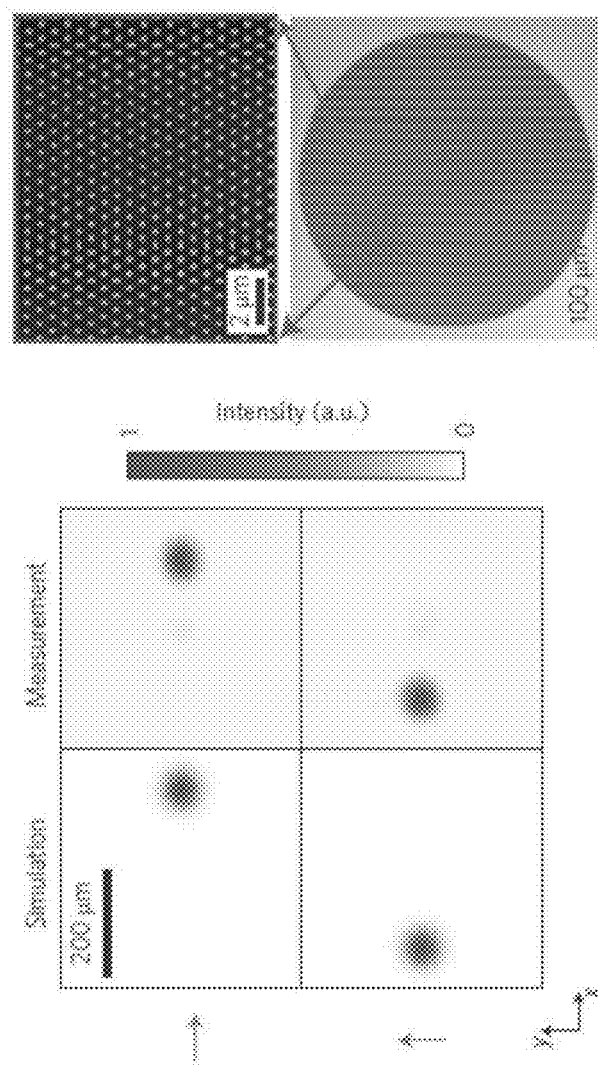
FIG. 8
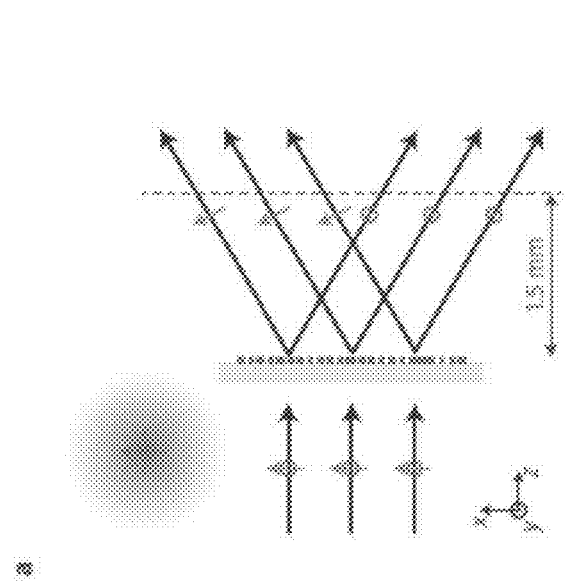

SIMULTANEOUS POLARIZATION AND WAVEFRONT CONTROL USING A PLANAR DEVICE

CROSS REFERENCE TO RELATED APPLICATIONS

The present application claims priority to U.S. Provisional Patent Application No. 62/050,641, filed on Sep. 15, 2014, and may be related to U.S. patent application Ser. No. 14/610,862, filed on Jan. 30, 2015, both disclosures being incorporated herein by reference in their entirety.

STATEMENT OF INTEREST

This invention was made with government support under Grant No. W911NF-14-1-0345 awarded by Army Research Office. The government has certain rights in the invention.

TECHNICAL FIELD

The present disclosure relates to optical devices. More particularly, it relates to simultaneous polarization and wavefront control using a planar device.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 8 illustrates a polarization beamsplitter that deflects x- and y-polarized portions of light by 5° and −5°.

SUMMARY

Figure 1:
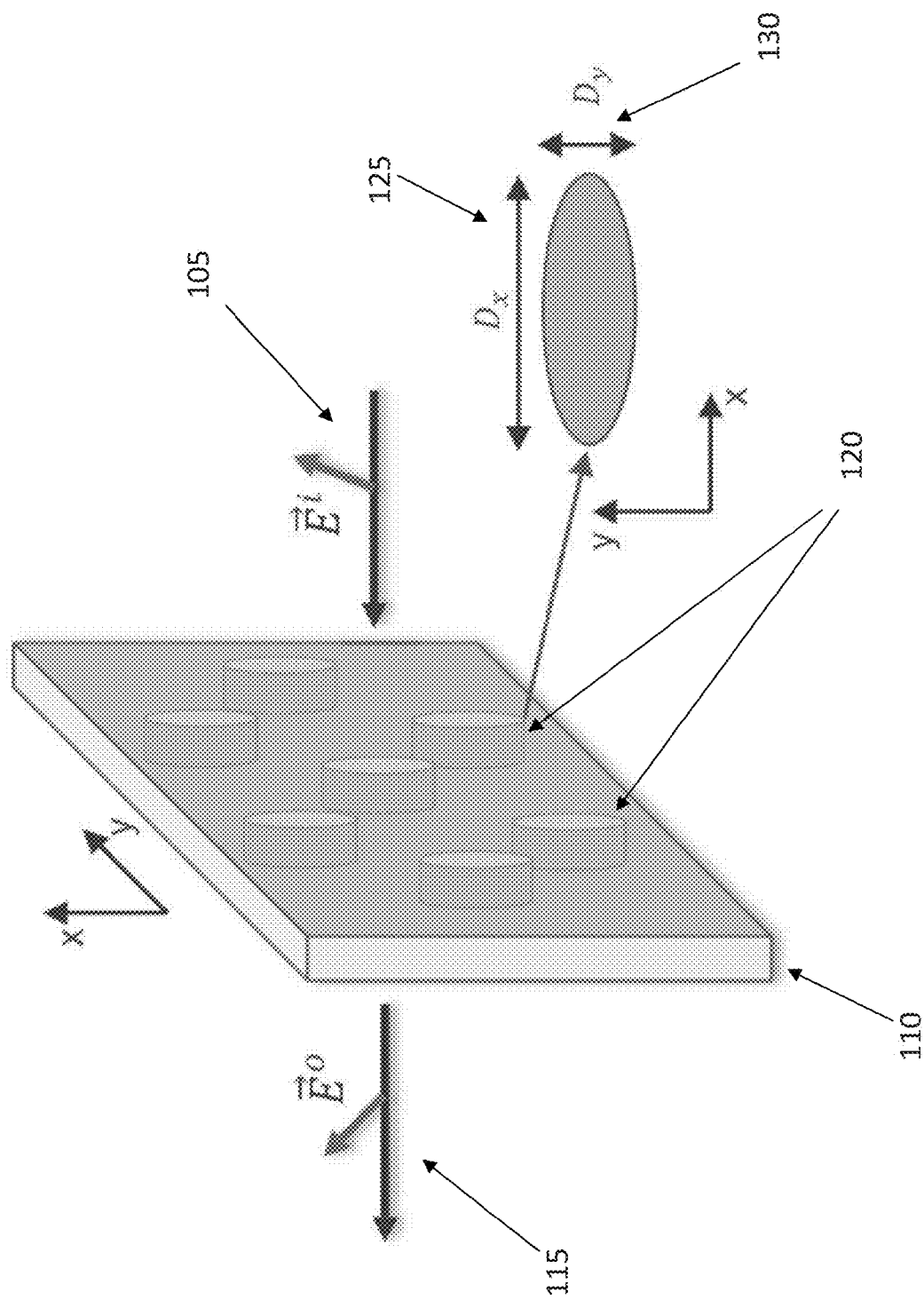
FIG. 1 illustrates a schematic illustration of an array of scatterers which change the polarization and phase of an incident light.

In a first aspect of the disclosure, a device is described, the device comprising: a substrate; and an array of 4-fold asymmetric electromagnetic scattering elements on the substrate, wherein the 4-fold asymmetric electromagnetic scattering elements have a higher refractive index than the substrate.

In a second aspect of the disclosure, a method is described, the method comprising: determining a desired polarization and phase shift of an electromagnetic wave scattered by a device, the device comprising a substrate and an array of 4-fold asymmetric electromagnetic scattering elements on the substrate, wherein the electromagnetic scattering elements have a higher refractive index than the substrate; calculating a Jones matrix for the scattered electromagnetic wave; determining a major axis, minor axis, height, and orientation of the major axis for each 4-fold asymmetric electromagnetic scattering element, according to the Jones matrix; fabricating the device according to the major axis, minor axis, height, and orientation of the major axis of each 4-fold asymmetric electromagnetic scattering element.

In a third aspect of the disclosure, a method is described, the method comprising: calculating a Jones matrix for an electromagnetic wave scattered by a device, the device comprising a substrate and an array of 4-fold asymmetric electromagnetic scattering elements on the substrate, wherein the electromagnetic scattering elements have a higher refractive index than the substrate; determining a major axis, minor axis, height, and orientation of the major axis for each 4-fold asymmetric electromagnetic scattering element, according to the Jones matrix; fabricating the device according to the major axis, minor axis, height, and orientation of the major axis of each 4-fold asymmetric electromagnetic scattering element; and controlling, by the fabricated device, a polarization and phase shift of the scattered electromagnetic wave.

DETAILED DESCRIPTION

Polarization, phase and amplitude completely characterize monochromatic light. In free-space optical systems, polarization is modified using wave retarders, polarizers and polarization beam-splitters, phase is shaped using lenses, curved mirrors or spatial phase modulators, and amplitude is controlled via neutral-density absorptive or reflective filters. Several metasurface platforms have been investigated recently to replicate the functionality of common optical components such as wave retarders, polarizers, beamsplitters, lenses or focusing mirrors. However, none of the platforms achieves complete control of both polarization and phase with subwavelength sampling and high transmission. A metasurface platform achieves complete control over polarization and phase if it can generate any desired physically admissible spatially varying polarization and phase distributions from an input beam with arbitrary polarization and phase distributions. Plasmonic metasurfaces have been demonstrated, but they have limited efficiencies because of fundamental limits, see Refs. [12-13] and metal absorption loss, see Refs [11,14-15]. Components based on one-dimensional high-contrast gratings have higher efficiencies, but do not provide the high spatial resolution necessary for realizing precise phase or polarization profiles in the direction along the grating lines, see Refs. [10,16-19]. The majority of flat elements have been realized using a platform that provides only phase control, see Refs. [2-3,9-10,16,18,20-24] (in most cases only for a fixed input polarization) or only a limited polarization modification capability, see Refs. [5,11,25-28]. The platform of the present disclosure does not suffer from these limitations and provides a unified framework for realizing any device for polarization and phase control with an average transmission higher than 85%.

Conventional optical components such as lenses, mirror, wave retarders, polarizers, and polarization beam splitters operate based on modifications of the wavefront or the polarization of light. Thin flat optical diffractive elements can achieve some of the functionalities of conventional optical components, and due to their planar geometry can be readily fabricated on a chip using conventional micro-fabrication techniques. These flat optical elements can also be cascaded to implement an on-chip optical system. Several different designs of flat diffractive optical elements for achieving phase (see Refs. [1-3]) or polarization (see Refs. [4-6]) modifications have been proposed. The present disclosure describes the design and implementation of general thin diffractive optical devices that achieve efficient simultaneous polarization and wavefront control.

In some embodiments, the present disclosure describes thin planar diffractive optical devices that are composed of single layer composed of an array layer of optical scatterers. For example, the array may comprise dissimilar optical scatterers, so that each of the scatterers, or scattering elements, is different from the other scatterers in the array. In some embodiments, not all scatterers are dissimilar within the array. For example, the array may be formed of elliptical elements. Some of the elliptical elements may be in a different orientation relative to others. For example, if the major axis of an elliptical element is considered as to indicate its orientation, then a group of scatterers may be oriented in the same direction, while other scatterers in the array may be oriented in a different direction. In other embodiments, the direction of the elliptical elements in the array may vary according to a specified function. For example, the orientation of adjacent elements may gradually vary so that adjacent scattering elements are oriented in a different orientation, but with a small angular difference. The angular difference in orientation between distant scatterers may then be greater relative to adjacent scatterers. The change in orientation, in other embodiments, may also be periodic so that distant scatterers may be oriented substantially in the same direction, while adjacent scatterers have a different orientation. The orientation of the scatterers may be adjusted according to the desired polarization and wavefront control. Other parameters may be controlled instead of, or in addition to, the orientation of elliptical scatterers. For example, the dimension, material and shape of the scatters may be different and even not elliptical.

The optical scatterers in the array have large refractive index and are resting on a low refractive index material. Arbitrary simultaneous polarization and wavefront control can be achieved when each of the scatterers performs the desired polarization conversion and induces the desired phase shift to the light incident at its position. The devices disclosed herein have a very low profile, are low weight and can be mass produced at low cost using a single lithography step and standard micro-fabrication techniques. Special examples of the general devices disclosed herein include wave retarders, polarization beam splitters and focusers, and cylindrical beam generator and focusers.

An embodiment of the devices of the present disclosure is composed of an array of potentially dissimilar scatterers made of a material with a large refractive index surrounded by materials of lower refractive index. The spatial period of the array can be smaller than the desired wavelength of operation of the device. Each of the scatterers display a polarization dependent scattering response. A scatterer can be, for example, a scattering material layer.

An embodiment of the devices of the present disclosure can be realized by using elliptical silicon posts resting on a fused silica substrate. As shown in FIG. 1, the light (105) that is normally incident to the substrate (110) undergoes a phase shift and polarization modification (115) as it passes through the elliptical silicon posts (120). The polarization of the light linearly polarized along the major or minor axis of the elliptical posts does not change and only undergoes a phase shift. Therefore, the elliptical posts behave effectively similarly to a material with birefringence. Birefringence is the optical property of a material having a refractive index that depends on the polarization and propagation direction of light. In this example, the structure comprising a substrate and the elliptical posts is anisotropic as the optical response of the posts varies depending on the polarization direction of the incident light.

Figure 2:
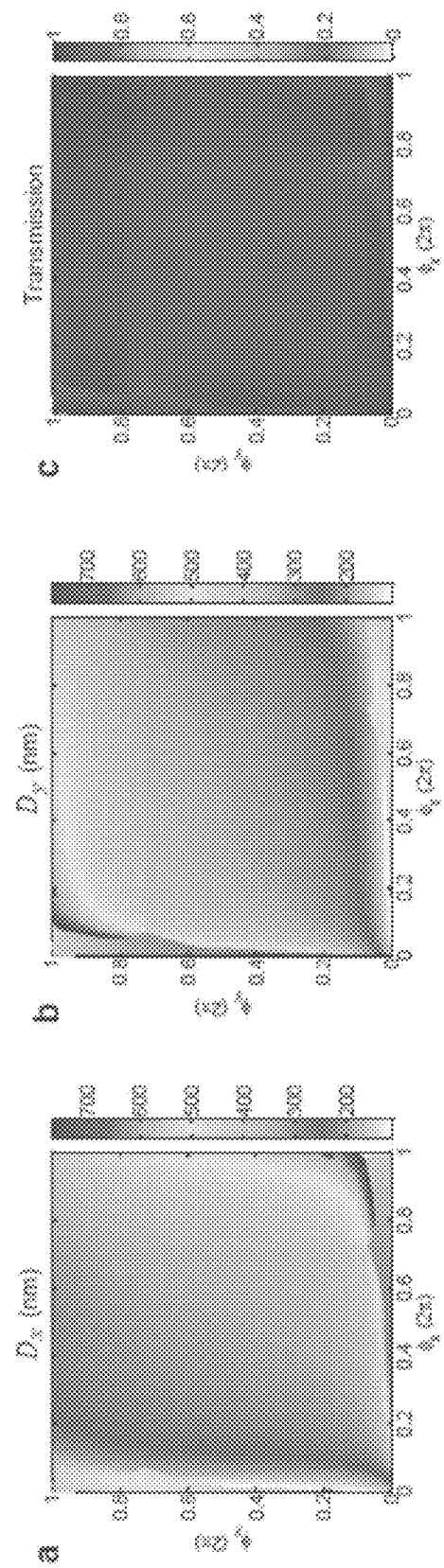
FIG. 2 illustrates graphs of calculations on parameters of the elliptical posts.

By proper selection of the height, major (125) and minor (130) axes (or diameters) of the elliptical posts, it is possible to simultaneously obtain phase shifts in the full 0 to $2\pi$ range, for two linearly polarized electromagnetic waves with polarization directions along the elliptical post axes. FIG. 2, panels a and b, shows an example of how it is possible to achieve, by varying the two diameters of amorphous silicon elliptical posts with axes along the x and y directions, any combination of phase shifts $\phi_x$ and $\phi_y$ for lights polarized along x and y directions, respectively. The x and y directions, relative to the elliptical post axis, are shown in FIG. 1. FIG. 2, panel c shows that the average transmission for all values of $\phi x$ and $\phi y$ remains high.

FIG. 2, panel a, illustrates color coded simulation values of the diameter of the elliptical posts shown in FIG. 1 along x ($D_x$), while panel b is along y ($D_y$), as a function of $\phi_x$ and $\phi_y$. $D_x$ and $D_y$ are the elliptical diameters, while $\phi_x$ and $\phi_y$ represent the phase change that x-polarized and y-polarized electromagnetic waves undergo as they pass through the elliptical post. FIG. 2, panel c, illustrates color coded values of the average transmission of the light through the elliptical posts with diameters shown in panels a and b, as a function of $\phi_x$ and $\phi_y$. The aSi (amorphous Si) posts (with a refractive index of 3.43 at $\lambda$=1550 nm) are 1230 nm tall and are resting on a fused silica substrate. In other embodiments, different dimensions may be used for the posts.

As shown in FIG. 2, any arbitrary polarization and phase for the output light can be achieved using the elliptical posts as described in the present disclosure. The general relationship between the electric field of the input and output light for a normally incident light is expressed using a Jones matrix as $$\begin{bmatrix} E_x^o \\ E_y^o \end{bmatrix} = T \begin{bmatrix} E_x^i \\ E_y^i \end{bmatrix} \qquad (1)$$

where $E_x^i$ and $E_y^i$ are the x and y components of the electric field of the input light, $E_x^o$ and $E_y^o$ are the x and y components of the electric field of the output light, and T is the 2×2 Jones matrix. It can be shown that the elements of a symmetric and unitary Jones matrix that satisfy Eq. (1) can be found using the following equations $$\begin{bmatrix} E_x^{o*} & E_y^{o*} \\ E_y^i & E_y^i \end{bmatrix} \begin{bmatrix} T_{11} \\ T_{12} \end{bmatrix} = \begin{bmatrix} E_x^{i*} \\ E_x^o \end{bmatrix} \quad (2a)$$

$$T_{11} = T_{12} \quad (2b)$$

$$T_{22} = -e^{-2i\phi_{12}} T_{11}^* \quad (2c)$$

where the symbol * represents complex conjugation and $\phi_{12}$ is the angle of $T_{12}$. As an example, for an x-polarized input light, the Jones matrix found using Eqs. (2a), (2b) and (2c) is given by $$T = \begin{bmatrix} E_x^o & E_y^o \\ E_y^o & -\frac{E_y^o}{E_y^{o*}} E_x^{o*} \end{bmatrix}. \quad (3)$$

Since the Jones matrix found using Eqs. (2a), (2b) and (2c) is symmetric and unitary, it can be decomposed in terms of its eigenvectors as $$T = V\Delta V^T = V \begin{bmatrix} e^{i\phi_1} & 0 \\ 0 & e^{i\phi_2} \end{bmatrix} V^T \quad (4)$$

where V is a real unitary matrix, and the superscript T represents the matrix transpose operation. It is possible to write V as $$V = \begin{bmatrix} \cos\theta & -\sin\theta \\ \sin\theta & \cos\theta \end{bmatrix} \quad (5)$$

which corresponds to a geometrical rotation by angle θ. Therefore, any output polarization and phase ($E^o$) can be generated from any incident field ($E^i$) by using a Jones matrix found from Eq. (2), and the Jones matrix can be decomposed according to Eq. (4). Since V corresponds to a geometrical rotation by an angle θ, the Jones matrix (T) can be realized by using an elliptical post which is rotated counterclockwise by angle θ along the post axis (as shown in FIG. 3, panel a), and which introduces phase retardations of $\phi_1$ and $\phi_2$ for electromagnetic waves polarized along the ellipse's two axes.

Figure 3:
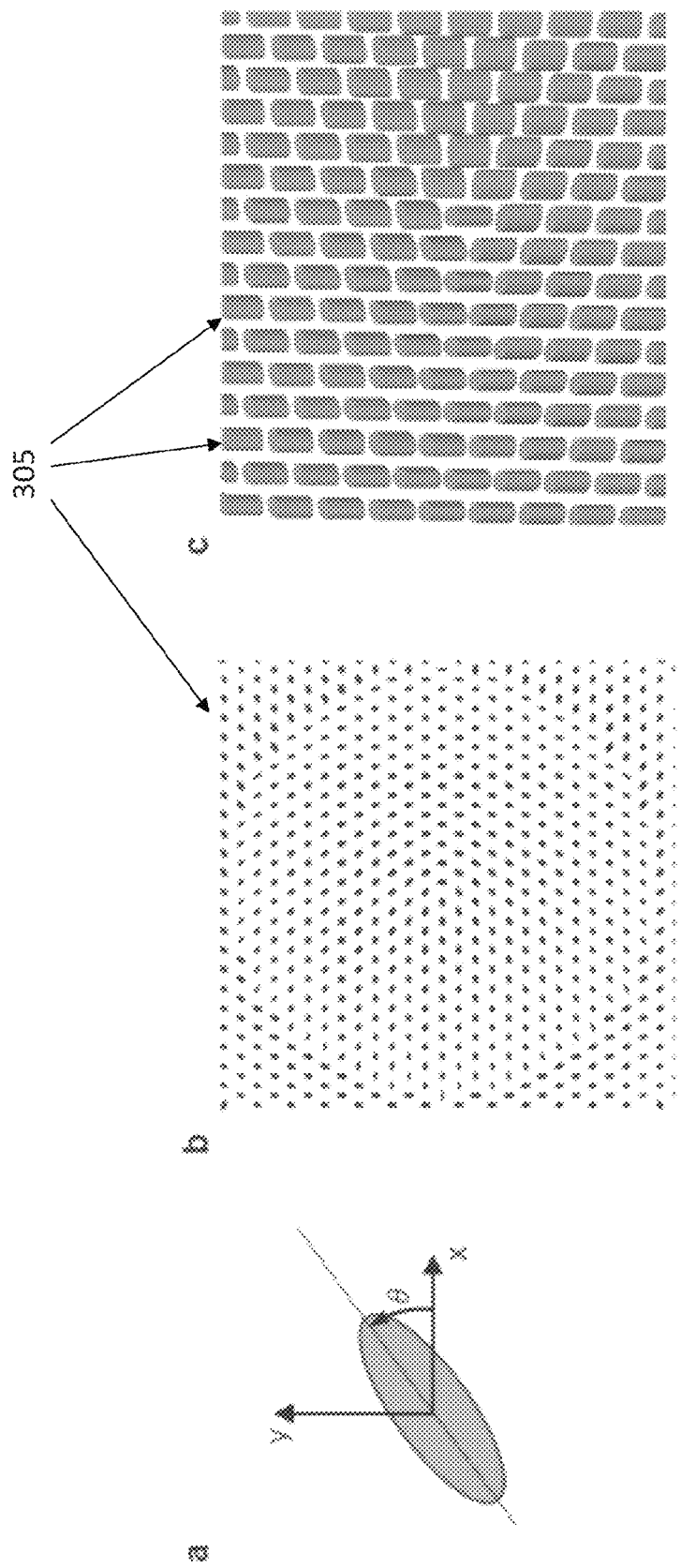
FIG. 3 illustrates exemplary elliptical posts.

FIG. 3, panel a, illustrates a schematic of the top view of a rotated elliptical post, while panels b, and c, show the top and 3D view of an example of the devices of the present disclosure. In some embodiments, the device is composed of an array of elliptical posts (305) with different sizes and orientations which shape the polarization and phase of an incident light at the same time.

By proper selection of the two major and minor diameters of an elliptical post (which correspond to $\phi_1$ and $\phi_2$ as shown in FIG. 2, panels a and b), and its rotation angle θ, any arbitrary output field can be generated at the location of the elliptical post. Thus, by positioning dissimilar elliptical posts at the lattice points of a periodic lattice, any arbitrary polarization and phase distribution can be created. A schematic illustration of a preferred embodiment of an example of the disclosed devices is shown in FIG. 3, panels b and c. As can be seen from FIG. 3, panels b and c, elliptical posts of the same height with different diameters and orientation create a thin and planar device that can generate any arbitrary phase and polarization distribution.

Figure 4:
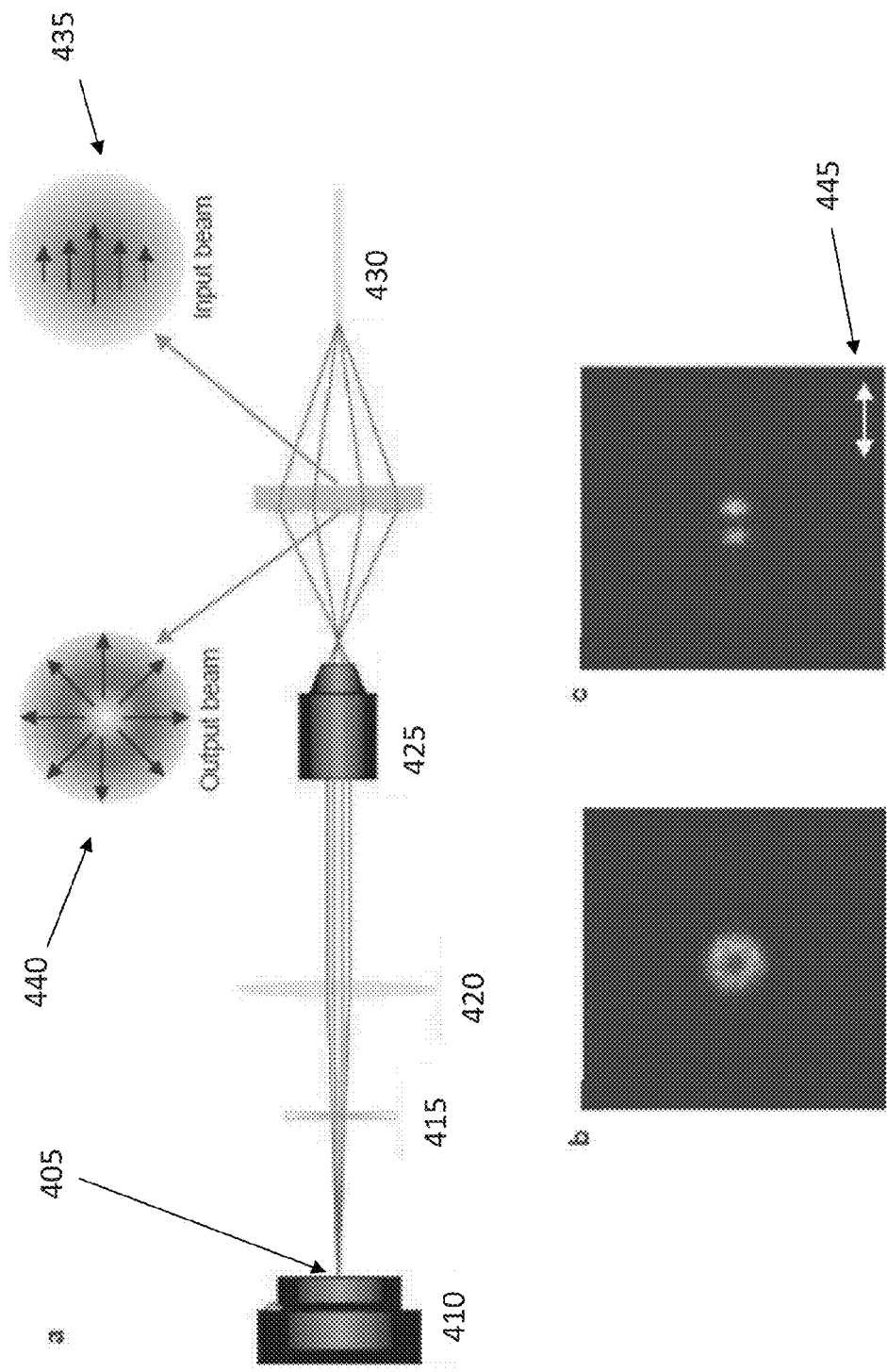
FIG. 4 illustrates an exemplary measurement setup.

An example of a device that is realized using the disclosed invention is shown in FIG. 3, panels b and c. The device converts a linearly polarized light into a radially polarized light and at the same time focuses the light. FIG. 4, panel a shows the measurement setup used for characterizing the devices of FIG. 3. The setup comprises a camera (410), a polarizer (415), a tube lens (420), an objective lens (425), and a fiber collimator (430).

The measured light intensity at the focus (405) is shown in FIG. 4, panel b. The radial polarization of the light at the focus (405) can be confirmed by inserting a polarizer into the setup after the tube lens (420). The measured intensity with the polarizer inserted into the setup is shown in FIG. 4, panel c. The arrow (445) shown in the FIG. 4, panel c shows the direction of the transmission axis of the polarizer (415). The polarization of the input beam (435) and output beam (440) are also shown in FIG. 4.

In other embodiments, the devices of the present disclosure can have additional applications and comprise metasurfaces. Metasurfaces are planar structures that locally modify the polarization, phase and amplitude of light in reflection or transmission. Thus, enabling lithographically patterned flat optical components with functionalities controlled by design, see Refs. [7, 8]. Transmissive metasurfaces are especially important, as most optical systems used in practice operate in transmission mode. Several types of transmissive metasurface have been realized, see Refs. [3,9-11], but with either low transmission efficiencies or limited control over polarization and phase. In the present disclosure, a metasurface platform is described, based on high-contrast dielectric elliptical nanoposts that provide complete control of polarization and phase with subwavelength spatial resolution and an experimentally measured efficiency ranging from 72% to 97%, depending on the exact design. Such complete control enables the realization of most free-space transmissive optical elements such as lenses, phase plates, wave plates, polarizers, beamsplitters, as well as polarization-switchable phase holograms and arbitrary vector beam generators using the same metamaterial platform.

Figure 5:
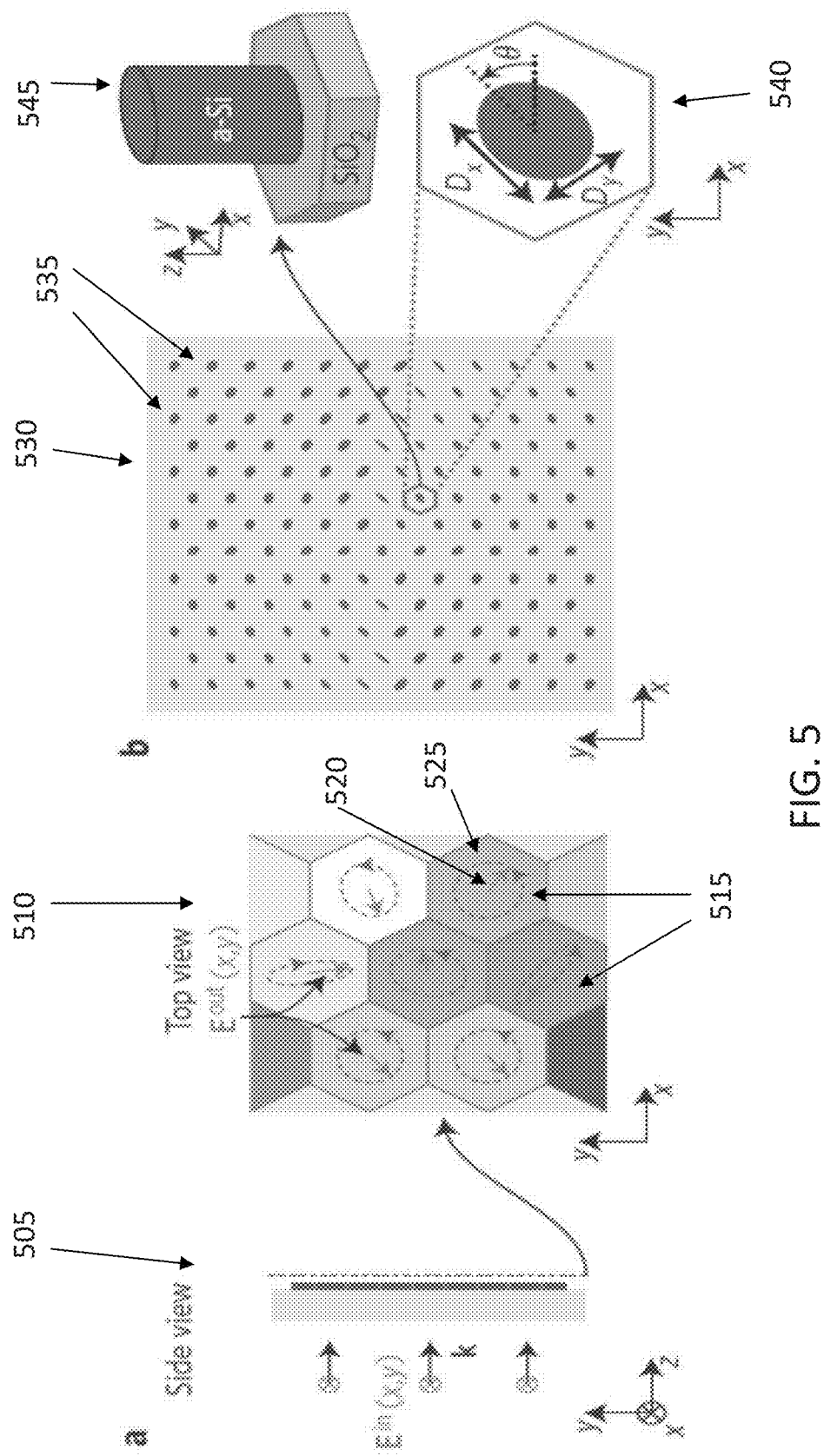
FIG. 5 illustrates a metasurface for complete polarization and phase control.

FIG. 5 illustrates a metasurface for complete polarization and phase control. In panel a, a schematic side view (505) and a top view (510) of a generic metasurface are illustrated, composed of hexagonal pixels (515). The polarization and phase of a normally incident optical wave with electric field $E^{in}$ (x, y) is modified at each pixel according to the pixel design. Each pixel (515) can have different designs. In the top view (510), the spatially varying electric field of the output transmitted light $E^{out}$ (x, y) at one moment in time and its polarization ellipse at each pixel (515) are shown by arrows (520) and dashed ellipses (525), respectively. In panel b, a top view of the proposed implementation of the metasurface is illustrated (530). The metasurface is composed of elliptical amorphous silicon posts (535) with the same height, but different diameters ($D_x$ and $D_y$) and orientations (θ). The posts (535) are located at the centres of the hexagonal unit cells (pixels). Panel b also illustrates a schematic three-dimensional view of an amorphous silicon post (545) and its magnified top view (540).

In FIG. 5, the metasurface is divided into hexagonal pixels, but other lattice types could also be chosen. An optical wave with spatially varying electric field $E^{in}$ is incident on the metasurface. The polarization ellipse and the phase of the optical field $E^{out}$ transmitted through each pixel can be controlled arbitrarily by the pixel design. To avoid diffraction of light into non-zero diffraction orders and to achieve the high polarization and phase gradients required for implementation of optical components such as lenses with high numerical apertures, it is important that each pixel has a lateral dimension smaller than the wavelength. The general relation between the electric fields of the input and output waves at each pixel is expressed using the Jones matrix according to Eq. 1. For metasurfaces with high transmission, any arbitrary $E^{in}$ can be mapped to any desired $E^{out}$ using a symmetric and unitary Jones matrix. Therefore, a metasurface platform achieves complete polarization and phase control if it can implement any unitary and symmetric Jones matrix at each pixel.

In FIG. 5, (530) presents a schematic exemplary illustration of a metasurface platform. The platform is composed of a single-layer array of amorphous silicon elliptical posts with different sizes and orientations, resting on a fused-silica substrate. The posts are placed at the centres of hexagonal unit cells. In a simplified picture, each post can be considered as a waveguide that is truncated on both sides and operates as a low-quality-factor Fabry-Pérot resonator. The elliptical cross-section of the waveguide leads to different effective refractive indices of the waveguide modes polarized along the two ellipse diameters. As a result, each of the posts imposes a polarization-dependent phase shift on the transmitted light and modifies both its phase and polarization. In the regime of operation considered herein (and as discussed in Ref. [22]), light is mainly confined inside the high-refractive-index posts, which behave as weakly coupled low-quality-factor resonators. Therefore, the light scattered by each post is primarily affected by the geometrical parameters of the post and has negligible dependence on the dimensions and orientations of its neighbouring posts. As a result, each unit cell of the lattice can be considered as a pixel, similar to the illustration shown in FIG. 5, panel a.

Light scattering by high-refractive-index single dielectric scatterers has been studied previously, and it has been shown that the scatterers may possess strong effective magnetic dipoles and exhibit large forward scattering, see Refs. [29-31]. In the present disclosure, instead of studying the properties of a single elliptical post, a different approach is employed to examine the transmission properties of periodic arrays of weakly coupled posts. Such periodic arrays better approximate the local transmission properties of a metasurface composed of gradually varying posts. The Jones matrix of the periodic array is used to approximate the local Jones matrix of each pixel. This approximation is used herein to successfully realize high-performance devices for polarization and phase control, thus further validating its accuracy.

In some embodiments, a periodic array of elliptical posts can be realized with one ellipse axis aligned to one of the hexagonal lattice vectors. Due to symmetry, a normally incident optical wave linearly polarized along one of the ellipse axes does not change polarization and only acquires phase as it passes though the array. The phase shifts imposed by the array to the x- and y-polarized waves (that is, $\phi_x$ and $\phi_y$) are functions of the elliptical post diameters $D_x$ and $D_y$. Therefore, the array behaves as a two-dimensional material with adjustable birefringence whose principal axes are along the x and y directions. The phases ($\phi_x$ and $\phi_y$) and intensity transmission coefficients ($|t_x|^2$ and $|t_y|^2$) can be determined via simulations as functions of the ellipse diameters. From the simulations, the required diameters $D_x$ and $D_y$ to achieve all combinations of $\phi_x$ and $\phi_y$, while maintaining high transmission can be derived from a graph such as those of FIG. 2, panels a and b, or FIG. 19 (or other similar graphs depending on the wavelength of operation). Any combination of $\phi_x$ and $\phi_y$ can be simultaneously obtained by properly choosing $D_x$ (such as from FIG. 2, panel a) and $D_y$ (such as from FIG. 2, panel b). The corresponding intensity transmission coefficients ($|t_x|^2$ and $|t_y|^2$) are larger than 87% for all values of $\phi_x$ and $\phi_y$. The complete phase coverage combined with the high transmission results in the high performance of this platform.

Figure 6:
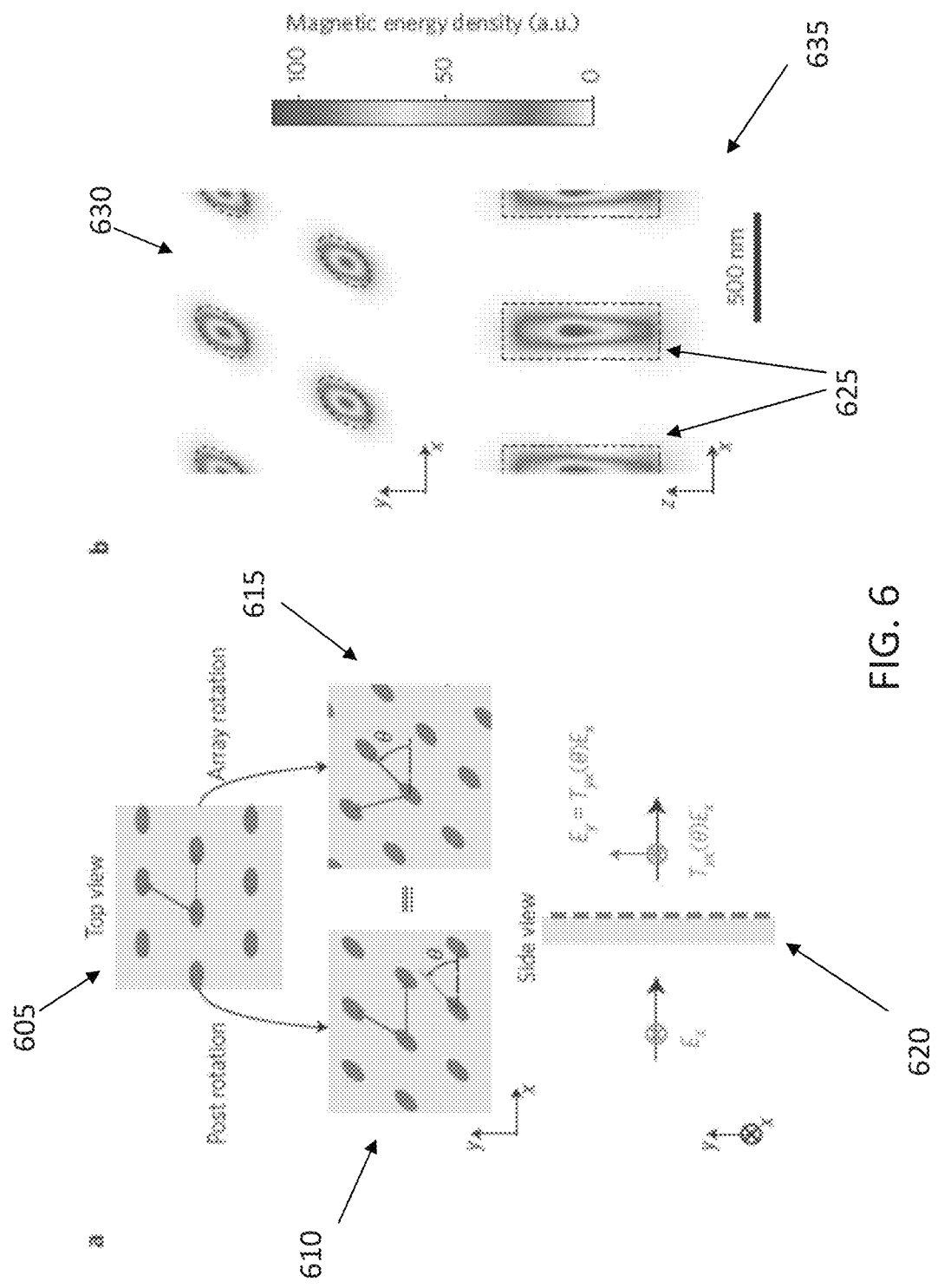
FIGS. 6 and 7 illustrate the equivalence of the array and post rotations.

The principal axes of a birefringent array can be rotated by rotating the entire array or, to a good approximation, by rotating all posts around their axes. This can be seen in FIGS. 6 and 7, which show that rotating the posts around their axes leads to approximately the same Jones matrix elements as rotating the entire array by the same angle. This is a result of the confinement of the optical energy inside the posts (as can be seen in FIG. 6, panel b), which has led to weak coupling among the posts, see Ref. [22]. This also provides further evidence that the polarization and phase transformation by the elliptical posts can be considered a local effect.

Figure 7:
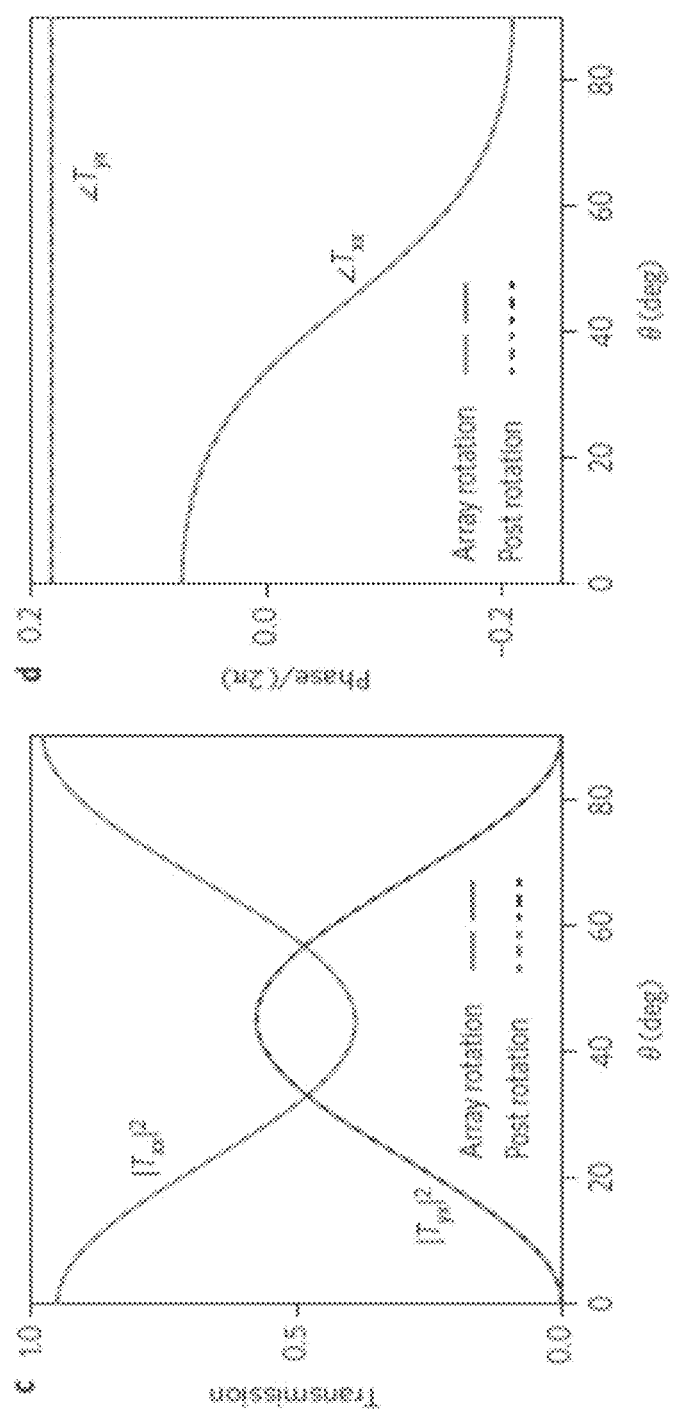

FIGS. 6 and 7 illustrate the equivalence of the array and post rotations. FIG. 6 panel a shows a schematic illustrations of an array (605) with one of the ellipse diameters aligned to one of the lattice vectors, and two arrays (610, 615) obtained from the first array either by only rotating the elliptical posts, or by rotating the entire array by the same angle θ. Because of birefringence, the rotated arrays convert a portion of the incident x-polarized light to y-polarized light, as schematically illustrated in the side view (620).

FIG. 6 panel b illustrates the simulated magnetic energy density when light propagates through an array of posts rotated by 45° with respect to the lattice. Dashed black lines (625) depict the boundaries of the posts (top, 630: x-y cross-section; bottom, 635: x-z cross-section). In FIG. 7, panels c,d illustrate simulated values of two elements of the Jones matrices ($T_{xx}$ and $T_{yx}$) of the two arrays shown in FIG. 6, as a function of θ. The plots show that the coefficients are almost identical in both cases.

As described above, a metasurface can achieve complete polarization and phase control if each of its pixels can be designed to realize any unitary and symmetric Jones matrix. Any desired symmetric and unitary Jones matrix can be realized using a birefringent metasurface if $\phi_x$ and $\phi_y$ and the angle between one of the principal axes of the material and the x-axis (θ) can be chosen freely. All these degrees of freedom are achievable at each pixel through selection of the post diameters $D_x$ and $D_y$ and its in-plane rotation angle θ. Therefore, any desired spatially varying polarization and phase profiles can be generated by sampling the incident wavefront with a subwavelength lattice and placing elliptical posts with proper dimensions and rotation angles at the lattice sites to impart the required phase and polarization change on the transmitted light. The proposed metasurface platform samples both the incident and the transmitted wavefront with subwavelength resolution in both silica and air because the reciprocal vectors of the lattice are larger than the wavenumber of light and thus, for close to normal incidence, first-order diffraction is not present.

The freedom provided by the platforms of the present disclosure to simultaneously control the polarization and phase of light allows for implementation of a wide variety of optical components. To demonstrate the versatility and high performance of this platform, two categories of flat optical elements were fabricated and characterized, operating at the near-infrared wavelength of 915 nm. The exemplary devices consist of 715 nm tall amorphous silicon posts with diameters ranging from 65 to 455 nm, arranged on a hexagonal lattice with a lattice constant of 650 nm. Devices belonging to the first category generate two different wavefronts for two orthogonal input polarizations. This functionality can be achieved if the device does not change the polarization ellipses of the two orthogonal polarizations it has been designed for, and only changes their handedness or chirality.

Figure 9:
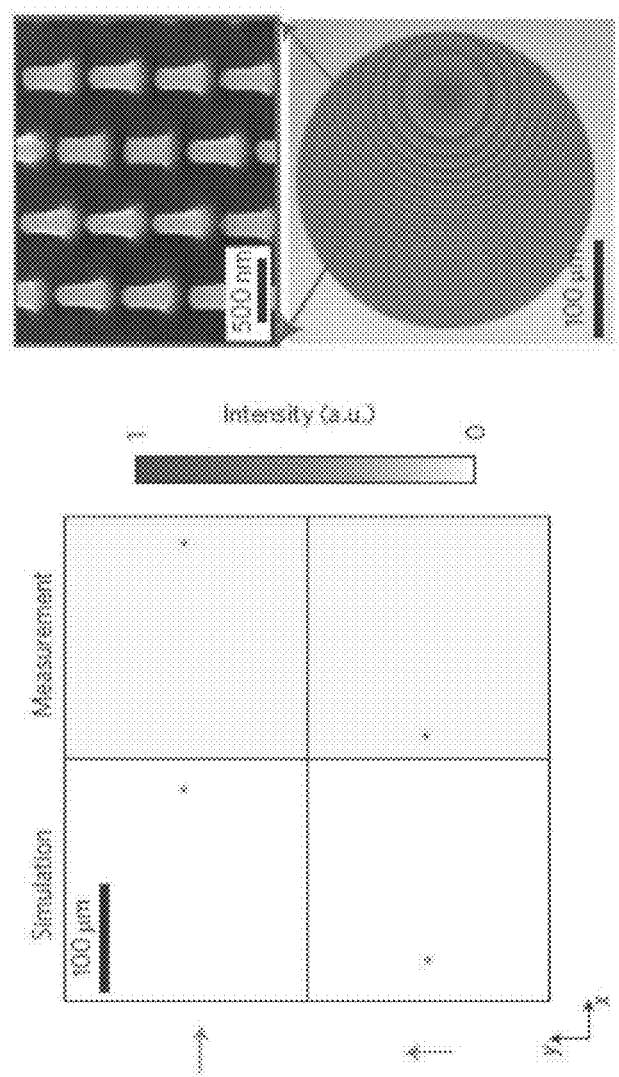
FIG. 9 illustrates a polarization beamsplitter that separates and focuses the x- and y-polarized light to two different points.
Figure 9:
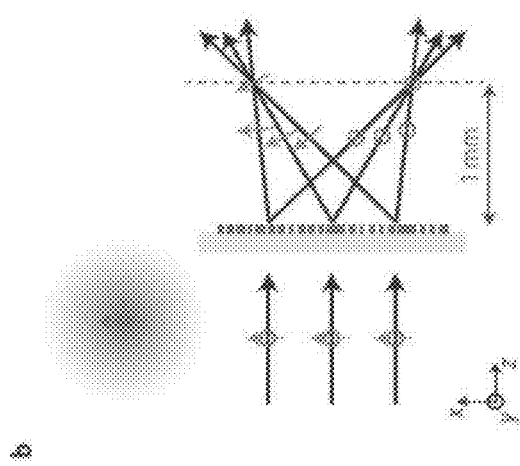
Figure 10:
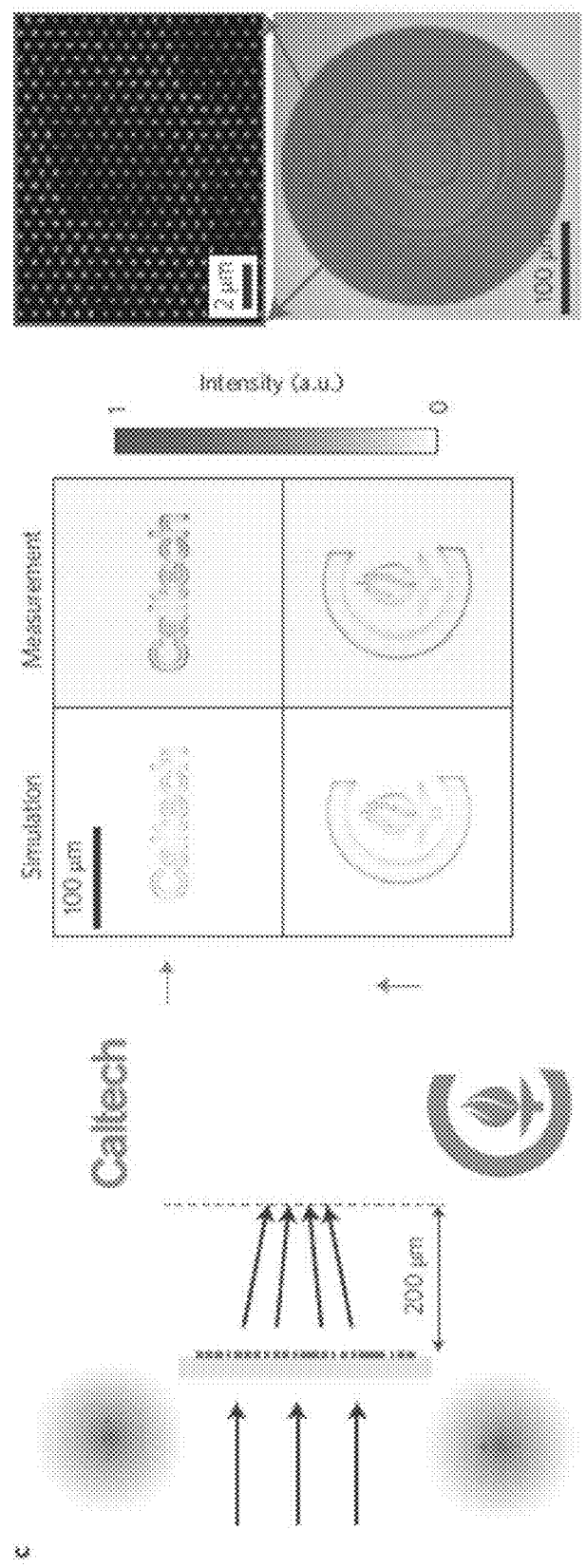
FIG. 10 illustrates a polarization-switchable phase hologram that generates two distinct patterns for x- and y-polarized light.

A special case occurs when both input polarizations are linear. Simulation and experimental measurement results, as well as optical and scanning electron microscope images of three types of device in this category, are shown in FIGS. 8-10. A polarization beamsplitter that deflects x- and y-polarized portions of light by 5° and −5° is presented in FIG. 8. Measurements gave 72% and 77% efficiencies for the x- and y-polarized input light, respectively. The measured efficiencies are smaller than their corresponding simulated values (89% for x-polarized and 93% for y-polarized incident beams) because of slight differences between the diameters of the designed and fabricated posts.

A polarization beamsplitter that separates and focuses the x- and y-polarized light to two different points is presented in FIG. 9. The focusing efficiency (defined as the ratio of the optical power focused to the desired spot to the input power) was measured as 80% and 83% for the x- and y-polarized light, respectively.

A polarization-switchable phase hologram that generates two distinct patterns for x- and y-polarized light is shown in FIG. 10. The recorded pattern changes with polarization. This is the most general form of device from this category, and other devices may be constructed based on a similar principle. Measurements gave efficiencies of 84% and 91% for this device for x- and y-polarized incident light. The measured intensity profiles presented in FIGS. 8-10 show the total transmitted light as detected by the camera, and there is no background subtraction.

Figure 11:
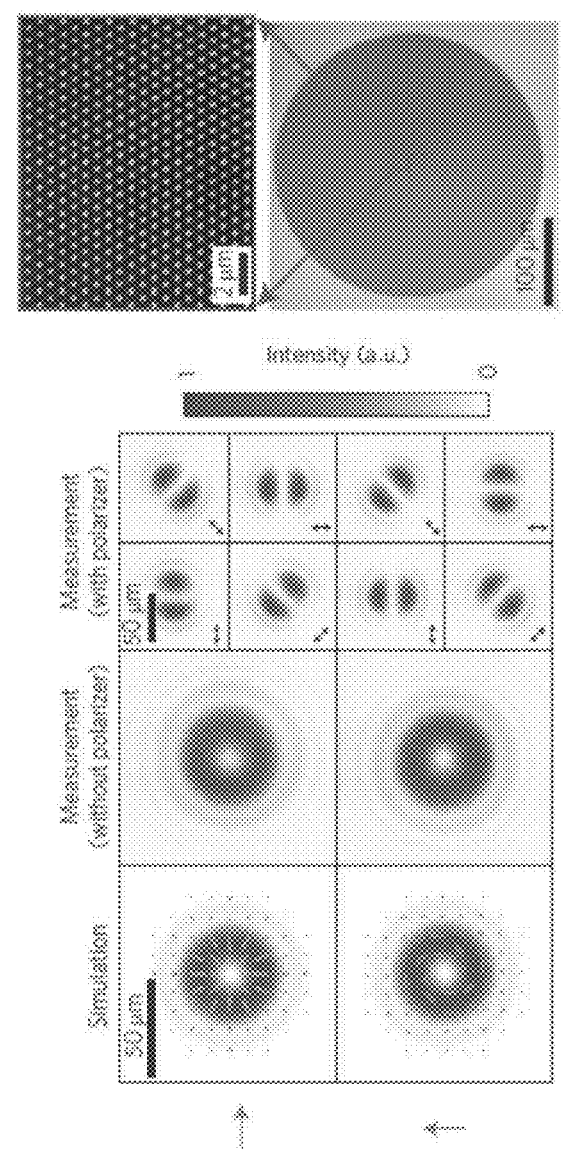
FIG. 11 shows a device that transforms an incident x-polarized incident Gaussian beam into a radially polarized Bessel-Gauss beam, and a y-polarized incident Gaussian beam into an azimuthally polarized Bessel-Gauss beam.
Figure 11:
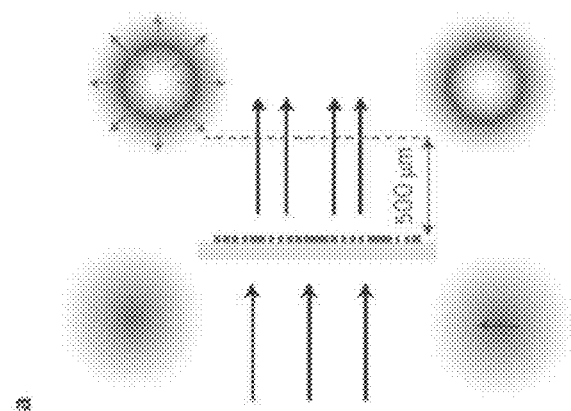
Figure 12:
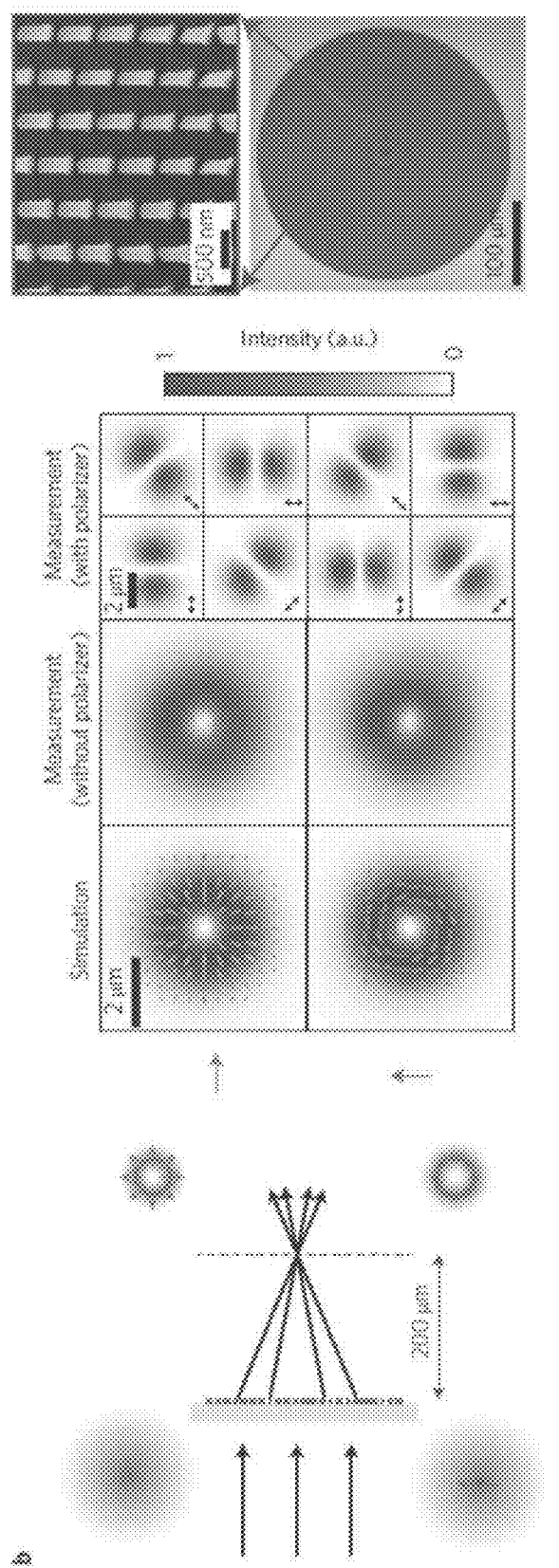
FIG. 12 illustrates a device that simultaneously generates and focuses radially and azimuthally polarized light.
Figure 13:
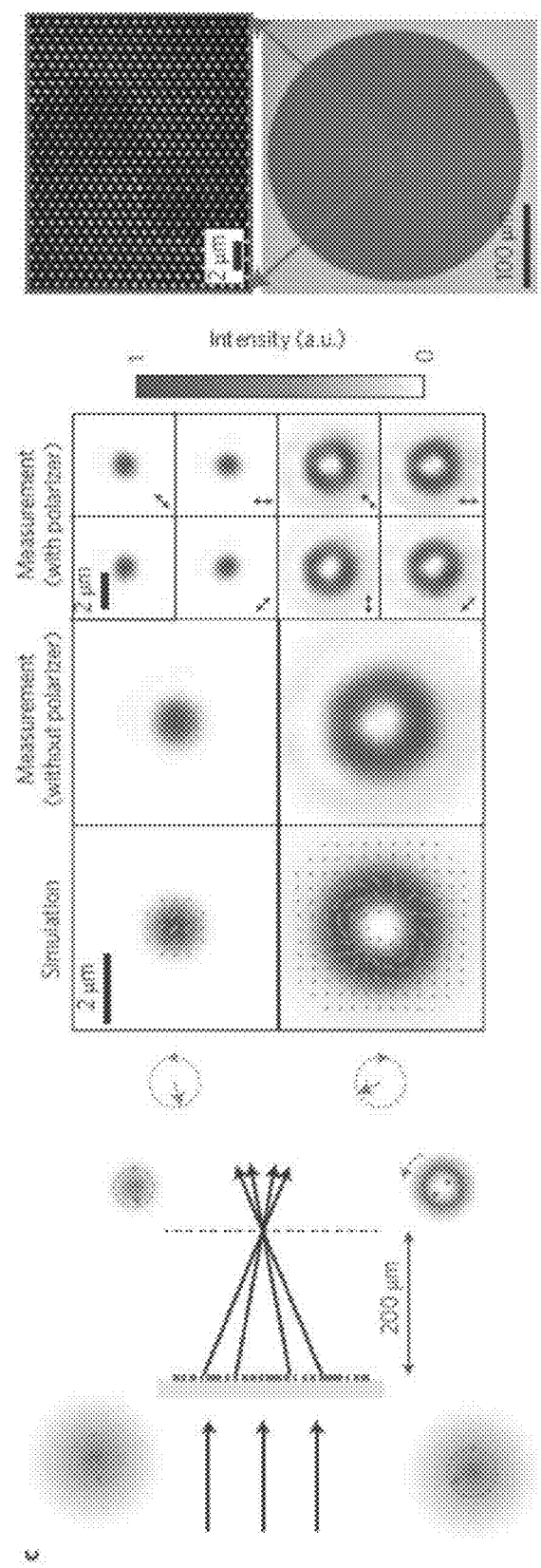
FIG. 13 illustrates a device that focuses a right-handed circularly polarized incident beam to a nearly diffraction-limited spot and left-handed circularly polarized light to a donut-shaped spot.

Devices in some embodiments generate light with a desired arbitrary phase and polarization distribution from incident light with a given polarization. FIG. 11 shows a device that transforms an incident x-polarized incident Gaussian beam into a radially polarized Bessel-Gauss beam, and a y-polarized incident Gaussian beam into an azimuthally polarized Bessel-Gauss beam. Measurements gave transmission efficiencies of 96% and 97% for the x and y input polarizations, respectively. The measured intensity profiles for different polarization projections are also shown in FIGS. 11-13. When the polarization of the incident Gaussian beam is linear but not aligned with the x or y axes, a generalized cylindrical vector beam is generated by this device. It has been shown recently that cylindrical vector beams show unique features such as focus shaping when focused with a high-numerical-aperture lens, see Ref. [32]. Furthermore, the same device in FIG. 11 generates light with different orbital angular momentum depending on the helicity of the input beam; right-and left-handed circularly polarized input beams will respectively acquire m=1 and m=−1 units of orbital angular momentum as they pass through this device. Both the generation and focusing of cylindrical vector beams can be performed using a single device based on the platforms of the present disclosure. Such a device, which simultaneously generates and focuses radially and azimuthally polarized light, is shown in FIG. 12. Similarly to the device shown in FIG. 11, due to the polarization conversion, right-and left-handed polarized beams acquire plus or minus one units of orbital angular momentum as they pass through the device. As a result, by adding a sinusoidal dependence in the form of exp(iφ) to the phase profile of the device, the total orbital angular momentum of the right-and left-handed circularly polarized light after passing through the device will become m=0 and m=2, respectively. A device with such a phase and polarization profile is shown in FIG. 13. As can be seen from the simulation and measurement results, a right-handed circularly polarized incident beam is focused to a nearly diffraction-limited spot while a left-handed circularly polarized beam is focused into a doughnut-shaped intensity pattern. Therefore, the focal spot shape can be modified by changing the polarization of the incident beam. This is particularly interesting because the polarization state of the incident beam can be switched rapidly using a phase modulator.

The functionalities provided by some of the optical devices demonstrated herein can only be achieved (alternatively) by using a combination of multiple bulk optical components. For example, to realize the functionality of the polarization beamsplitter and focuser in FIG. 9, a Wollaston prism and two carefully aligned lenses are required. The realization of the polarization vector beams shown in FIGS. 11-13 generally requires interferometry (see Ref. [33], liquid-crystal spatial light modulators, or conical Brewster prisms (see Ref. [34]. The complete and simultaneous control over the polarization and phase profiles of light offered by the proposed platform and the design technique enables the realization of novel optical components with functionalities exactly tailored to specific applications and with the form factors required for emerging applications such as wearable consumer electronics. As with most other diffractive optical elements, these devices have an optical bandwidth of several per cent of the design wavelength, see Ref. [35]. Thus, they could directly replace conventional optics in applications employing narrow-band light sources such as optical communications, monochromatic imaging and multi-photon microscopy. It can be noted that the theoretical approach and the design technique of the present disclosure are general and applicable to similar platforms with other types of scatterer and lattice shape, provided they offer complete and independent phase control for two orthogonal polarizations. The operating wavelength can also be changed by scaling the device dimensions. Further improvements are expected from using materials with optical nonlinearities and gain that might extend the spectral bandwidth of operation and provide tunability. These metasurfaces could also be patterned on curved or flexible substrates, thus enabling conformal optical devices.

In some embodiments, the nanoposts are arranged in a crystalline-like arrangement, periodic over the whole substrate, or part thereof. For example, an hexagonal lattice vectors can be used (which is described by two vectors and their angle). The nanopost arrangement can then be specified by lattice vectors, analogously to the lattice vectors of crystals. For example, the vectors may give the distance between two adjacent posts, and the angle between the lattice vectors. Once a cell in the crystal is described, the remaining array of nanoposts, or part thereof, can be replicated by periodic repetition of the original cell. In some embodiments, the diameters of each elliptical post can be determined from simulations for the polarization of the waves, such as for example from panels a and b of FIG. 2. The diameter along the x axis, for example, can be determined from the polarization simulations of the x-polarized wave (polarized in the x axis direction), and similarly for the y axis.

To obtain the simulation results of the present disclosure, such as in FIG. 2, the transmission coefficients $t_x$ and $t_y$ of x- and y-polarized plane waves for a periodic hexagonal array were computed by using the rigorous coupled wave analysis (RCWA) technique using a freely available software package, see Ref. [36]. The simulations were performed at $\lambda$=915 nm. The amorphous silicon posts (refractive index of 3.56 at 915 nm) are 715 nm tall and rest on a fused-silica substrate. These transmission coefficients were computed for all mutual values of the ellipse diameters $D_x$ and $D_y$ in the range 0.1a-0.7a, where a=650 nm is the lattice constant. For normal incidence, the array is non-diffractive in both air and fused silica at wavelengths longer than $\lambda_1$=nSiO $\sqrt{3}$/2a=816 nm. Next, using the computed transmission coefficients for all combinations of phases $\phi_x$ and $\phi_y$, the diameters $D_x$ and $D_y$ that minimize the mean squared error were found.

It should be noted that the elliptical posts obtained using this method do not possess resonances close to the operation wavelength because the transmission values go to zero at resonance and increase the mean squared error. The simulation results presented in FIGS. 6 and 7 were also computed using the RCWA technique, with diameters of the elliptical posts as 300 and 150 nm.

To design the devices presented in FIGS. 8-10, which impose two distinct phase profiles to x- and y-polarized light, the optimum phase profiles that generate the desired patterns were first determined by back-propagating the desired pattern to the plane of the device and finding the phase difference between the back-propagated wave and the incident wave. This method is discussed in details in Ref. [22]. After finding the desired phase profiles for both polarizations, the profiles were sampled at the lattice sites, and elliptical posts with major and minor diameters that would impart the required phases to the transmitted beam were placed on those sites.

The optical elements shown in FIGS. 11-13 that simultaneously modify the polarization and phase of the light were designed to generate a desired spatially varying optical wave from a given input optical wave profile. The input and output optical waves at the lattice sites were first sampled, then the Jones matrix was computed and decomposed into its eigenvalues and eigenvectors to determine the desired phase shifts for waves polarized along the axes of the ellipse (that is, $\phi_x$ and $\phi_y$) and the rotation angle $\theta$. Finally, from FIG. 2 the diameters of the elliptical posts can be found, imposing the target $\phi_x$ and $\phi_y$ phase shifts, rotating them anticlockwise by their $\theta$, and placing them at their corresponding lattice sites.

The simulation results presented in FIGS. 8-13 were computed by assuming that the devices perform the polarization and phase conversions ideally and with $\lambda$/15 spatial resolution. For these simulations, the input light was assumed to be in the form of uniformly polarized Gaussian beams with the same beam radius as the illumination beam radius used in the corresponding measurements (35 µm for the device shown in FIG. 8 and 80 µm for the devices shown in FIGS. 9-13). The output light was computed at each point on a rectangular grid assuming ideal polarization and phase conversion by the device and then propagated to the planes of interest using the plane wave expansion technique, see Ref. [37].

The exemplary devices of the present disclosure were fabricated on a fused-silica substrate. A layer of 715 nm hydrogenated amorphous silicon was deposited using plasma-enhanced chemical vapour deposition (PECVD) with a 5% mixture of silane in argon at 200° C. Positive electron beam resist (300 nm, ZEP-520A) was then spin-coated, as well as about 60 nm of a water-soluble anti-charging conductive polymer (aquaSave, Mitsubishi Rayon) to avoid static charging during electron-beam lithography. The pattern was written on the resist using electron-beam lithography, the anti-charging layer was removed in water, and the pattern was developed in a resist developer (ZED-N50, Zeon Chemicals). A 70-nm-thick aluminium oxide layer was then deposited on the developed resist and patterned by lifting off the resist. The patterned aluminium oxide was subsequently used as a hard mask for dry etching of amorphous silicon in a 3:1 mixture of SF6 and C4F8. Finally, the aluminium oxide mask was removed using a 1:1 mixture of ammonium hydroxide and hydrogen peroxide heated to 80° C.

To compensate for systematic fabrication errors such as a non-optimum exposure dose in the electron-beam lithography patterning and possible undercutting during dry etching, for each of the devices shown in FIGS. 8-13 a series of devices was fabricated with all post diameters uniformly biased from their optimum design values in steps of 5 nm. Characterization results for the devices with different diameters showed that the device functionalities were not severely affected by these intentionally introduced systematic errors; only the device efficiencies were reduced from their maximum values by about 3% per each 5 nm error in the post diameters.

The exemplary devices were characterized using the set-up comprising light from a 915 nm fibre-coupled semiconductor laser passed through a fibre polarization controller and collimated to generate a Gaussian beam. To collimate the fibre output and generate Gaussian beams with a beam radius smaller than the device radius, a fibre collimation package was used (Thorlabs F220APC-780) together with a lens (Thorlabs LB1676-B with focal length of 10 cm to measure the devices in FIG. 8 and Thorlabs LB1945-B with a focal length of 20 cm for the devices shown in FIGS. 9-13). The illumination beam radius on the sample was adjusted by changing the distance between the lens and the sample. The beam radius was set to about 35 µm to measure the device shown in FIG. 8 to avoid overlap of the deflected and non-deflected portions of the output light at the measurement plane. To fill most of the device physical aperture, the illumination beam radius was set to 80 µm for all other measurements reported in FIGS. 9-13.

The objective lens, the tube lens (Thorlabs LB1945-B) and the camera (CoolSNAP K4, Photometrics) comprise a custom-built microscope. Three different objective lenses were used to achieve different magnifications. The measurement results shown in FIG. 8 were obtained using a ×20 objective lens (Olympus UMPlanFl, NA=0.4), the results shown in FIGS. 9-11 were recorded using a ×50 objective lens (Olympus LCPlan N, NA=0.65) and those presented in FIGS. 12-13 were obtained using a ×100 objective lens (Olympus UMPlanFl, NA=0.95). The overall microscope magnification for each objective lens was found by imaging a calibration sample with known feature sizes. The polarizer (Thorlabs LPNIR050-MP) was inserted into the set-up to confirm the polarization state of the incident light (after removing the device) and the output light. Efficiency values for the devices shown in FIGS. 8 and 11-13 were obtained by integrating the light intensity on the camera (that is, the measured intensity profiles shown in FIGS. 8-13), subtracting the dark noise, and normalizing it to the integrated intensity recorded when the device was removed. For the device shown in FIG. 8, only the intensity of the deflected portion of the output light was used for efficiency calculation.

To characterize the efficiency of the device shown in FIG. 9 the set-up comprised a 25-µm-diameter pinhole (Thorlabs P25S) placed at the focal plane of the device and aligned such that only the light focused to one of the two focal points could pass through it. To obtain the reported efficiencies, the optical power passed through the pinhole was measured using a power meter (Thorlabs PM100D with Thorlabs S122C power sensor) and was divided by the power of the incident beam, which was measured before the device.

The necessary condition for the design of a device that imposes two independent phase profiles to two optical waves with orthogonal polarizations can be calculated using Eqs. (2a), (2b) and (2c). The four elements of the Jones matrix T are found uniquely when the determinant of the matrix on the left hand side of Eq. (2b) is nonzero. Therefore, a devices that is designed to map $E^{in}$ to $E^{out}$, converts an optical wave whose polarization is orthogonal to $Ei^{in}$ to an optical wave polarized orthogonal to $E^{out}$. For example, an optical element designed to generate radially polarized light from x polarized input light, will also generate azimuthally polarized light from y polarized input light.

In the special case that the determinant of the matrix on the left had side of Eq. (2b) is zero then $$E_x^{out} * E_y^{in} - E_y^{out} * E_x^{in} = 0 \qquad (6)$$

and because T is unitary then $|E^{in}|=|E^{out}|$. Therefore $E^{out} = \exp(i\phi) E^{in*}$ where $\phi$ is an arbitrary phase. This special case corresponds to a device that preserves the polarization ellipse of the input light, switches its handedness (helicity), and imposes a phase shift on it. In this case, the T matrix is not uniquely determined from Eq. (2a), and an additional condition, such as the phase profile for the orthogonal polarization, can be imposed on the operation of the device. Therefore, the device can be designed to realize two different phase profiles for two orthogonal input polarizations.

Figure 14:
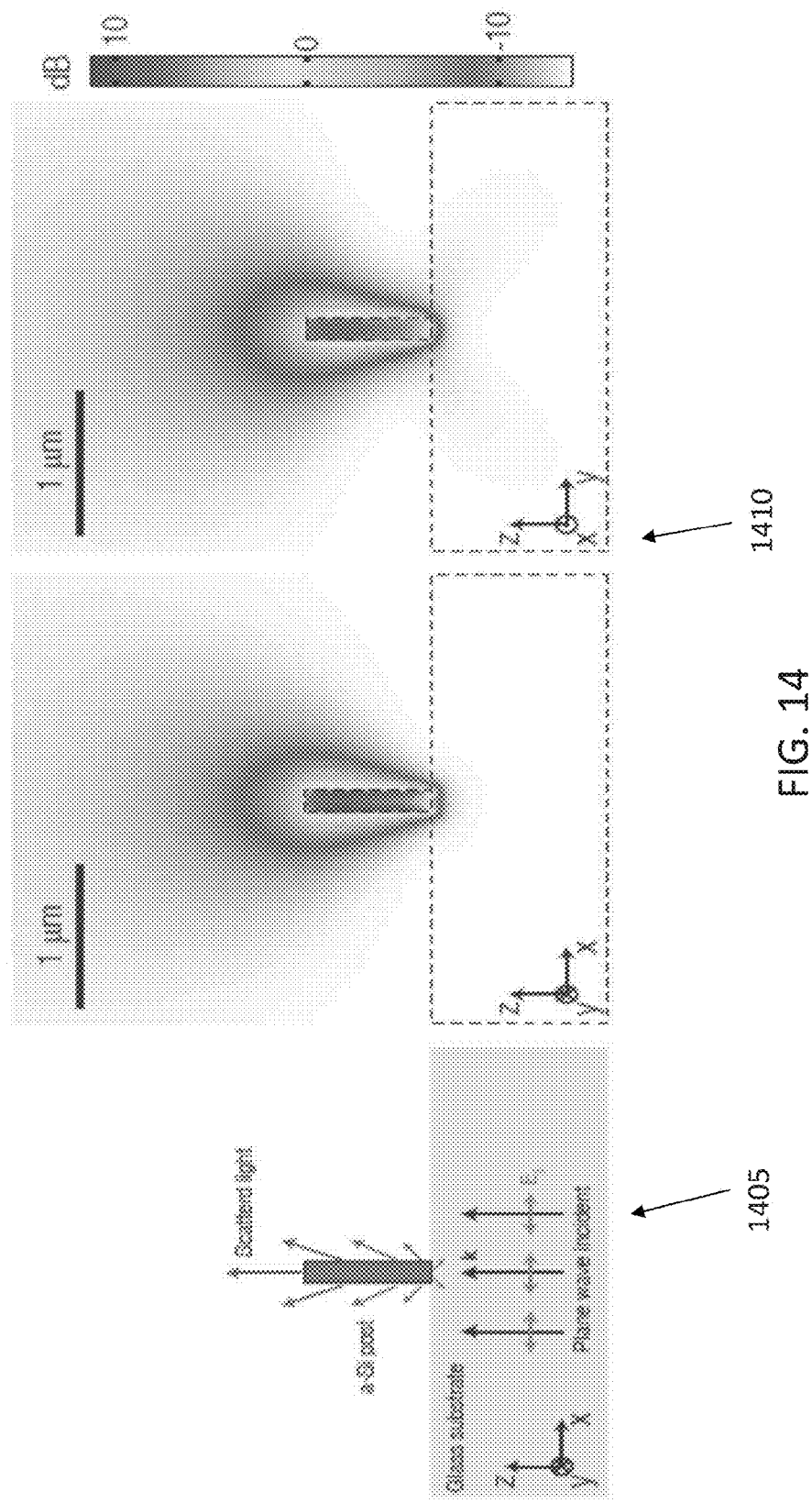
FIG. 14 illustrates the large forward scattering by a single amorphous silicon post.

FIG. 14 illustrates the large forward scattering by a single amorphous silicon post. A schematic illustration (1405) and finite element simulation results (1410) are shown, for light scattering by a single 715 nm tall circular amorphous silicon post with a diameter of 150 nm. The simulation results show the logarithmic scale energy density of the light scattered by the single amorphous silicon post over the xz and yz planes. The energy densities are normalized to the energy density of the 915 nm x-polarized incident plane wave.

Figure 15:
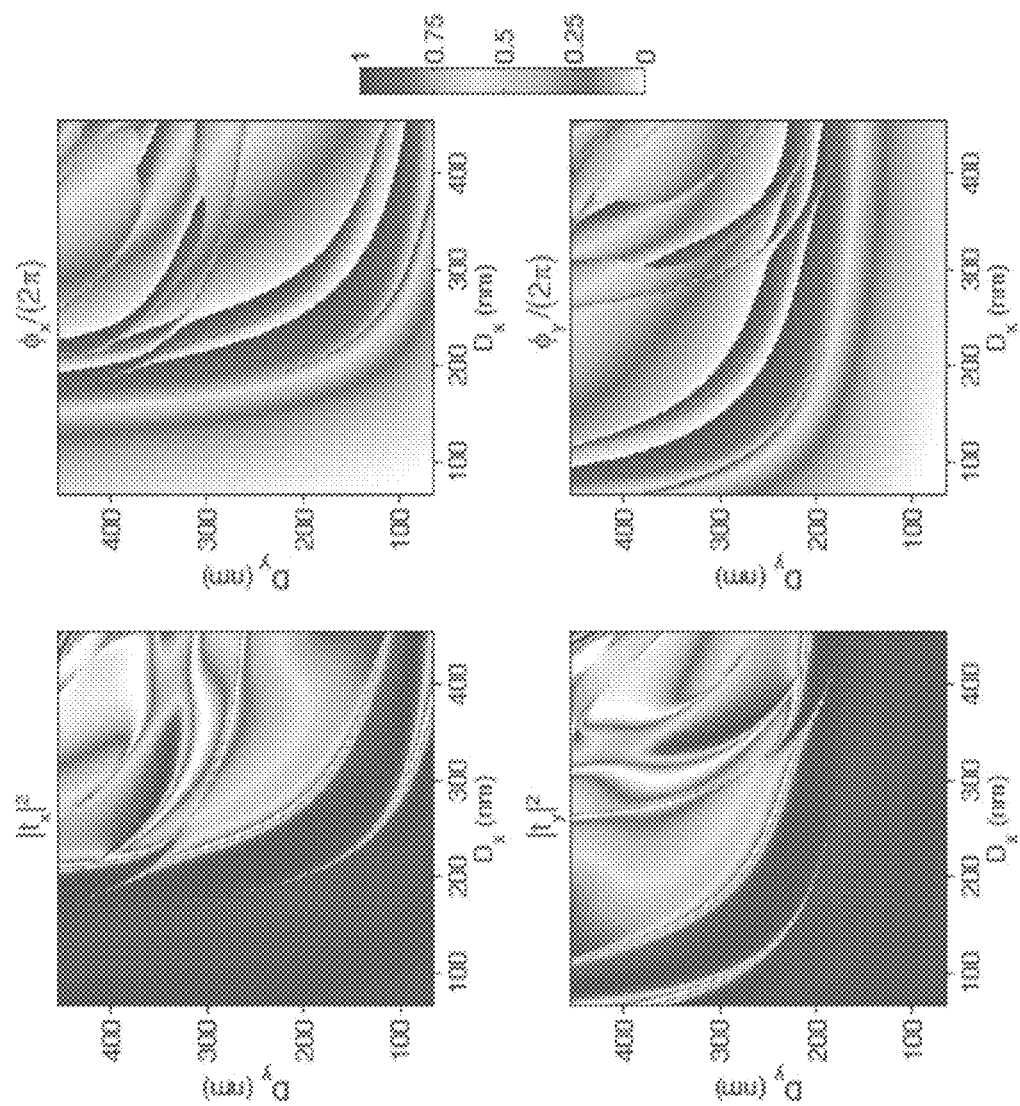
FIG. 15 illustrates phase shifts and intensity transmission coefficients as a function of elliptical post diameters, used to derive data in FIG. 19.
Figure 19:
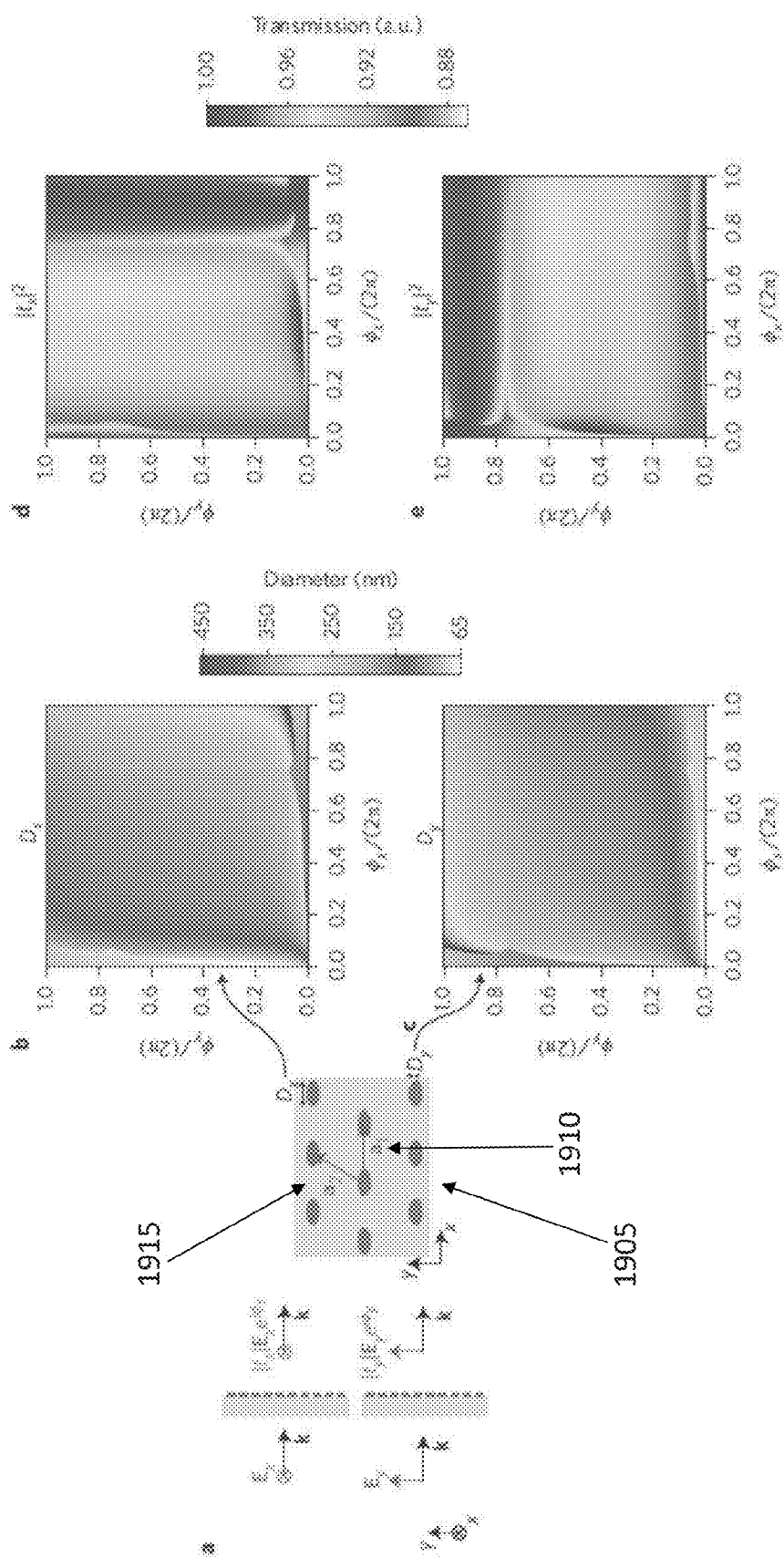
FIG. 19 illustrates data for a wavelength of 915 nm.

FIG. 15 illustrates phase shifts and intensity transmission coefficients as a function of elliptical post diameters, used to derive data in FIG. 19. Intensity transmission coefficients ($|t_x|^2$ and $|t_y|^2$) and the phase of transmission coefficients ($\phi_x$ and $\phi_y$) of x and y-polarized optical waves for the periodic array of elliptical posts shown in FIG. 19 as functions of the post diameters. The person of ordinary skill in the art will understand that FIG. 2 and FIG. 19 are exemplary for different wavelengths, and that similar graphs can be calculated appropriately, depending on the operational wavelength desired.

Figure 16:
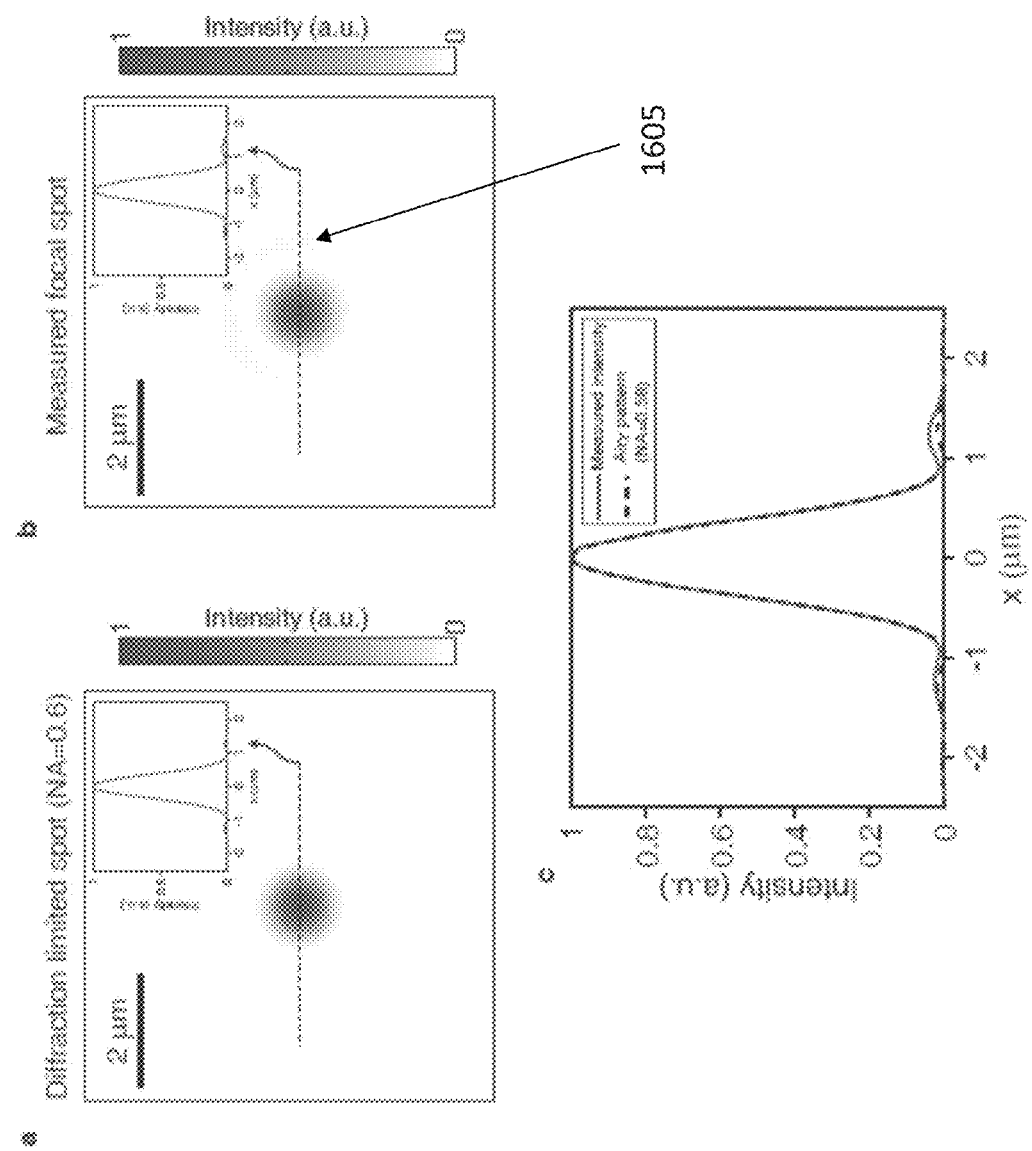
FIG. 16 illustrates diffraction limited focusing by device shown in FIG. 13.

FIG. 16 illustrates diffraction limited focusing by device shown in FIG. 13. In panel a, the theoretical diffraction limited focal spot (Airy disk) is shown for a lens with numerical aperture (NA) of 0.6 at the operation wavelength of 915 nm. Inset shows the intensity along the dashed line. In panel b, the measured focal spot is shown for the device in FIG. 13 when the device is uniformly illuminated with right handed circularly polarized 915 nm light. In panel. c, the measured intensity is shown along the dashed line (1605) and its least squares Airy pattern fit which has an NA of 0.58.

Figure 17:
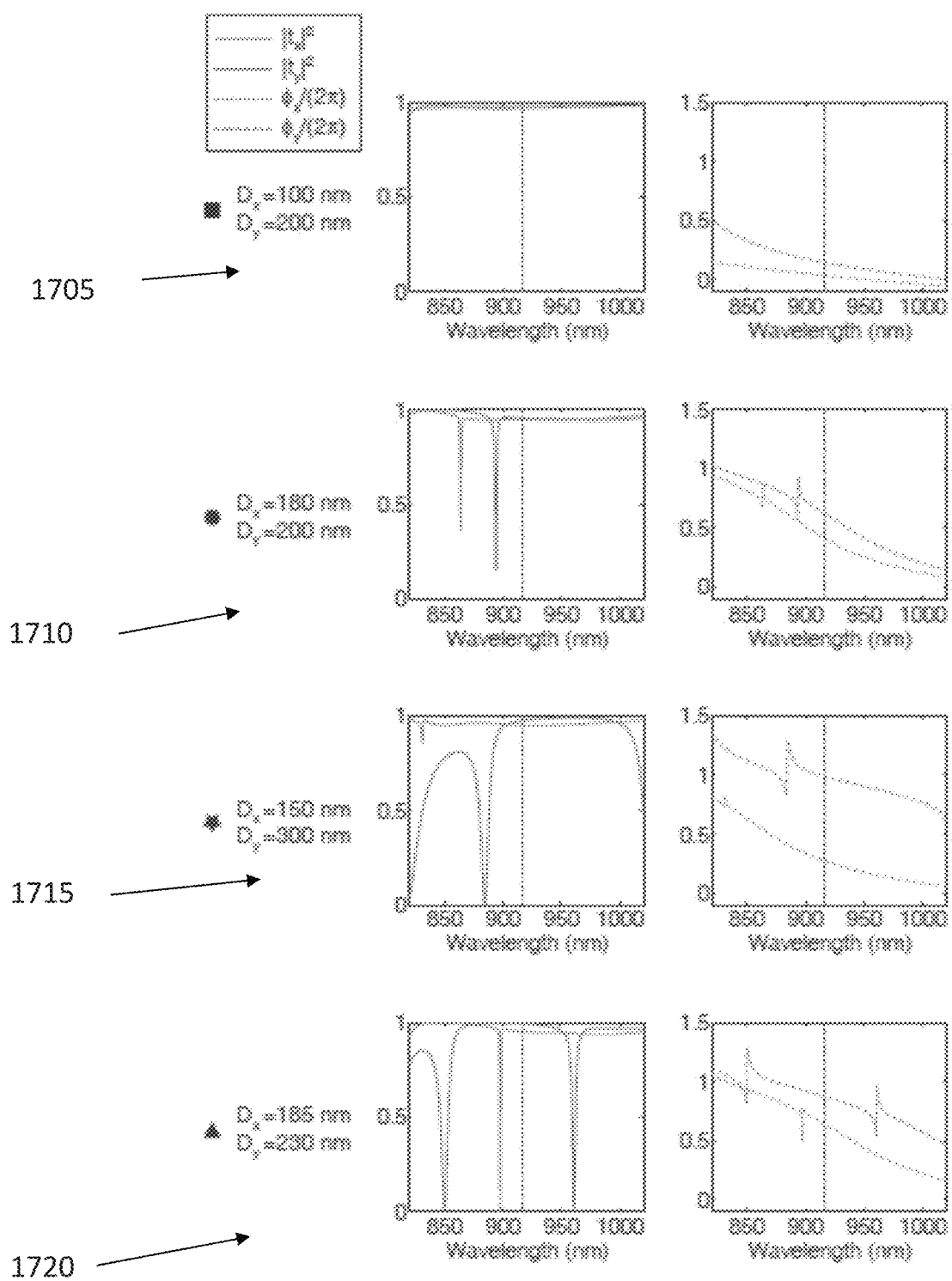
FIGS. 17-18 illustrate transmission spectra of periodic arrays of elliptical posts showing that the operation wavelength does not overlap with resonances.
Figure 18:
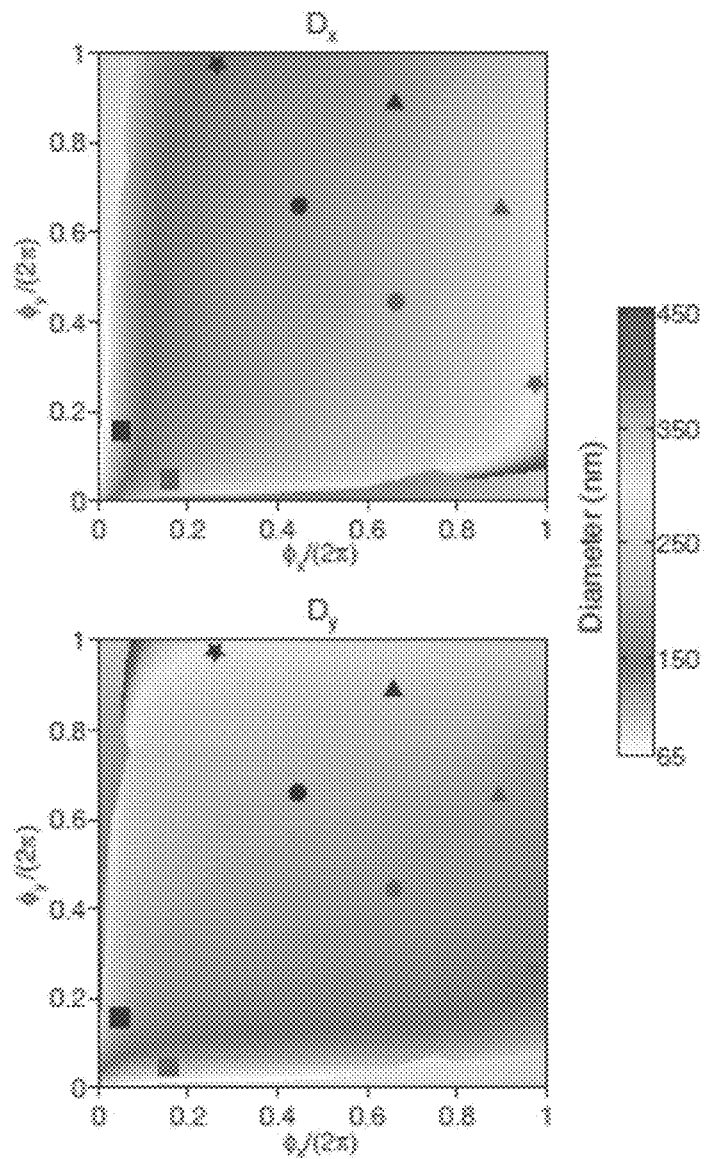

FIGS. 17-18 illustrate transmission spectra of periodic arrays of elliptical posts showing that the operation wavelength does not overlap with resonances. The wavelength dependence of the intensity transmission coefficients and the phase of transmission coefficients of x and y-polarized optical waves is shown for the periodic array schematically shown in FIG. 2. The spectra are shown for a few arrays with different ($D_x$, $D_y$) combinations: (1705, 100 nm, 200 nm), (1710, 180 nm, 200 nm), (1715, 150 nm, 300 nm), (1720, 185 nm, 230 nm). The corresponding phase shift values and post diameters for these arrays are shown on the $D_x$ and $D_y$ graphs in FIG. 18. The desired operation wavelength ($\lambda$=915 nm) is shown with dashed red vertical lines in the spectra plots, and it does not overlap with any of the resonances of the periodic arrays.

The graphs in FIG. 2 refer to a wavelength of 1550 nm and can be taken as an example of the methods of the present disclosure. The data in FIG. 19 refers to a wavelength of 915 nm. In FIG. 19, panel a, an exemplary array of optical scatterers is illustrated, for example in an hexagonal lattice array (1905). In the hexagonal lattice (1905), a first lattice vector (1910) and a second lattice vector (1915) define the periodic structure of the array. Data in panels a and b in similar to that discussed above for FIG. 2, although the data in FIG. 19 refers to a wavelength of 915 nm while FIG. 2 refers to a wavelength of 1550 nm. In FIG. 19, panels b and c, simulated colour-coded values are plotted, for the elliptical post diameters ($D_x$ and $D_y$) for achieving $\phi_x$ and $\phi_y$ phase shifts for x- and y-polarized optical waves, respectively. To realize a periodic array as shown in panel a, which imposes $\phi_x$ and $\phi_y$ phase shifts to x- and y-polarized optical waves, the diameter of the elliptical posts along x (that is, $D_x$) is obtained from panel b, and their corresponding diameter along y (that is, $D_y$) is found from panel c.

In FIG. 19, panels d and e illustrate simulated colour-coded values of the intensity transmission coefficients corresponding to the choice of ellipse diameters shown in panels b and c. The data in panel d refers to $t_x$ while the data in panel e refers to $t_y$, represent amplitude transmission coefficients for x- and y-polarized light, respectively. FIG. 19 refers to an operating wavelength of 915 nm, a lattice constant of 650 nm and amorphous silicon post height of 715 nm.

An operating principle of the devices of present disclosure is the lack of 4 fold rotational symmetry in the shape of the optical scatterers. A 4-fold rotational symmetry refers to the fact that a geometrical shape is unchanged under a rotation of 90 degrees. The lack of 4-fold rotational symmetry therefore implies that the shape is changed under a rotation of 90 degrees. Elliptical posts have a 2-fold rotational symmetry but lack a 4 fold rotational symmetry. The lack of 4-fold rotational symmetry enables the polarization dependent scattering response of the array as described in the present disclosure, for the x- and y-polarized electromagnetic waves. Therefore, other shapes that lack 4-fold rotational symmetry can also be used to fabricate arrays as described in the present disclosure. For example, rhomboidal or rectangular structures could be used. To refer to the fact that the shapes lack a 4-fold rotational symmetry, the term '4-fold asymmetric' can be used in the present disclosure to refer to the optical scatterers.

Figure 20:
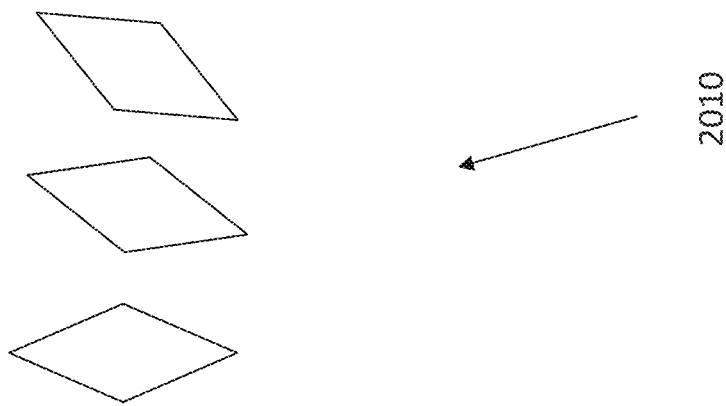
FIG. 20 illustrates different types of cross sections for posts.
Figure 20:
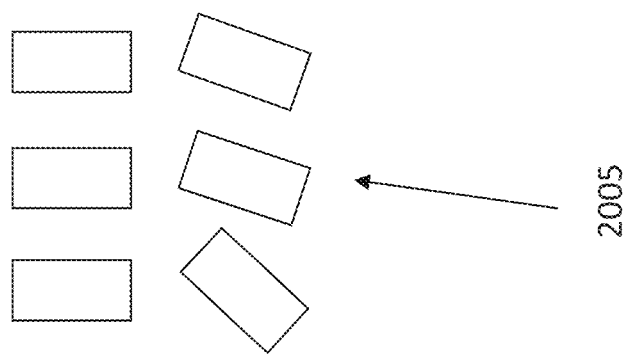

FIG. 20 illustrates an example of rectangular (2010) and rhomboidal (2005) cross section posts that can be used in alternative of the elliptical posts described above. In some embodiments, a mixture of different shapes can also be used. When referring to 4-fold asymmetric posts or cylinders, similarly as to the case of the elliptical cylinders, a major and minor axis can be defined, as well as post orientation based on the major axis.

As known to the person skilled in the art, the microwave range is normally between 1 mm and 100 mm wavelength, while the UV range is normally between 10 nm and 380 nm wavelength. The devices of the present disclosure, in some embodiments, can be operated at a range between the microwave and UV wavelengths. In some embodiments, the dimensions of the posts can be chosen according to a specific range of wavelength of operation. The optical elements of the present disclosure can therefore be termed as electromagnetic elements, to represent the fact that the wavelength can be outside the optical range.

In the examples of the present disclosure, cylinders or posts were discussed, however other geometrical shapes could be used as scatterers. For example, instead of a cylinder a pyramid could be used. Therefore, the methods and devices of the present disclosure relate to 4-fold asymmetric objects, such as cylinders, pyramids and truncated cones.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

1. Astilean, S et al., *High-efficiency subwavelength diffractive element patterned in a high-refractive-index material for 633 nm.* Optics Letters, 1998. 23: p. 552.
2. Warren, M. E., et al., *High-efficiency subwavelength diffractive optical element in GaAs for 975 nm.* Optics Letters, 1995. 20: p. 1441.
3. Vo, S., et al., *Sub-wavelength Grating Lenses with a Twist.* IEEE Photonics Technology Letters, 2014. 26: p. 1-1.
4. Flanders, D. C., *Submicrometer periodicity gratings as artificial anisotropic dielectrics.* Applied Physics Letters, 1983. 42: p. 492.
5. Mutlu, M., et al., *Experimental realization of a high-contrast grating based broadband quarter-wave plate.* Optics express, 2012, 20: p. 27966-73.
6. Yu, N., et al., *A broadband, background-free quarter-wave plate based on plasmonic metasurfaces.* Nano letters, 2012. 12: p. 6328-33.
7. Kildishev, A. V., Boltasseva, A. & Shalaev, V. M. Planar photonics with metasurfaces. Science 339, 1232009 (2013).
8. Yu, N. & Capasso, F. Flat optics with designer metasurfaces. Nature Mater. 13, 139-150 (2014).
9. Yu, N. et al. Light propagation with phase discontinuities: generalized laws of reflection and refraction. Science 334, 333-337 (2011).
10. Lin, D., Fan, P., Hasman, E. & Brongersma, M. L. Dielectric gradient metasurface optical elements. Science 345, 298-302 (2014).
11. Lin, J., Genevet, P., Kats, M. A., Antoniou, N. & Capasso, F. Nanostructured holograms for broadband manipulation of vector beams. Nano Lett. 13, 4269-4274 (2013).
12. Monticone, F., Estakhri, N. M. & Alù, A. Full control of nanoscale optical transmission with a composite metascreen. Phys. Rev. Lett. 110, 203903 (2013).
13. Arbabi, A. & Faraon, A. Fundamental limits of ultrathin metasurfaces. Preprint at http://arXiv.org/abs/1411.2537 (2014).
14. Aieta, F. et al. Aberration-free ultrathin flat lenses and axicons at telecom wavelengths based on plasmonic metasurfaces. Nano Lett. 12, 4932-4936 (2012).
15. Pfeiffer, C. & Grbic, A. Cascaded metasurfaces for complete phase and polarization control. Appl. Phys. Lett. 102, 231116 (2013).
16. Fattal, D., Li, J., Peng, Z., Fiorentino, M. & Beausoleil, R. G. Flat dielectric grating reflectors with focusing abilities. Nature Photon. 4, 466-470 (2010).
17. Lu, F., Sedgwick, F. G., Karagodsky, V., Chase, C. & Chang-Hasnain, C. J. Planar high-numerical-aperture low-loss focusing reflectors and lenses using subwavelength high contrast gratings. Opt. Express 18, 12606-12614 (2010).
18. Klemm, A. B. et al. Experimental high numerical aperture focusing with high contrast gratings. Opt. Lett. 38, 3410-3413 (2013).
19. Aieta, F., Kats, M. A., Genevet, P. & Capasso, F. Multiwavelength achromatic metasurfaces by dispersive phase compensation. Science 347, 1342-1345 (2015).
20. Lalanne, P., Astilean, S., Chavel, P., Cambril, E. & Launois, H. Design and fabrication of blazed binary diffractive elements with sampling periods smaller than the structural cutoff. J. Opt. Soc. Am. A 16, 1143-1156 (1999).
21. Arbabi, A. et al. Controlling the phase front of optical fiber beams using high contrast metastructures. OSA Technical Digest, STu3M.4 (Optical Society of America, 2014).
22. Arbabi, A., Horie, Y., Ball, A. J., Bagheri, M. & Faraon, A. Subwavelength-thick lenses with high numerical apertures and large efficiency based on high contrast transmitarrays. Nature Commun. 6, 7069 (2015).
23. West, P. R. et al. All-dielectric subwavelength metasurface focusing lens. Opt. Express 22, 26212 (2014).
24. Decker, M. et al. High-efficiency dielectric Huygens surfaces. Adv. Opt. Mater. 3, 813-820 (2015).

25. Kikuta, H., Ohira, Y. & Iwata, K. Achromatic quarter-wave plates using the dispersion of form birefringence. Appl. Opt. 36, 1566-1572 (1997).
26. Schonbrun, E., Seo, K. & Crozier, K. B. Reconfigurable imaging systems using elliptical nanowires. Nano Lett. 11, 4299-4303 (2011).
27. Yang, Y. et al. Dielectric meta-reflectarray for broadband linear polarization conversion and optical vortex generation. Nano Lett. 14, 1394-1399 (2014).
28. Zhao, Y., Belkin, M. A. & Alù, A. Twisted optical metamaterials for planarized ultrathin broadband circular polarizers. Nature Commun. 3, 870 (2012).
29. García-Etxarri, A. et al. Strong magnetic response of submicron silicon particles in the infrared. Opt. Express 19, 4815-4826 (2011).
30. Evlyukhin, A. B., Reinhardt, C. & Chichkov, B. N. Multipole light scattering by nonspherical nanoparticles in the discrete dipole approximation. Phys. Rev. B 84, 235429 (2011).
31. Spinelli, P., Verschuuren, M. A. & Polman, A. Broadband omnidirectional antireflection coating based on sub-wavelength surface Mie resonators. Nature Commun. 3, 692 (2012).
32. Zhan, Q. Cylindrical vector beams: from mathematical concepts to applications. Adv. Opt. Photon. 1, 1-57 (2009).
33. Phelan, C. F., Donegan, J. F. & Lunney, J. G. Generation of a radially polarized light beam using internal conical diffraction. Opt. Express 19, 21793-21802 (2011).
34. Kozawa, Y. & Sato, S. Generation of a radially polarized laser beam by use of a conical Brewster prism. Opt. Lett. 30, 3063 (2005).
35. Swanson, G. J. Binary optics technology: the theory and design of multi-level diffractive optical elements. Technical Report 845 (Massachusetts Institute of Technology, DTIC, 1989).
36. Liu, V. & Fan, S. S4: a free electromagnetic solver for layered periodic structures. Comput. Phys. Commun. 183, 2233-2244 (2012).
37. Born, M. & Wolf, E. Principles of Optics (Cambridge Univ. Press, 1999).
38. Arbabi et al., Dielectric metasurfaces for complete control of phase and polarization with subwavelength spatial resolution and high transmission, Nature Nanotechnology (2015) doi:10.1038/nnano.2015.186

What is claimed is:
1. A device comprising:
a substrate; and
an array of 4-fold asymmetric electromagnetic scattering elements on the substrate,
wherein the 4-fold asymmetric electromagnetic scattering elements are weakly coupled to each other, and have a higher refractive index than the substrate.
2. The device of claim 1, wherein the substrate is made of silica and the 4-fold asymmetric electromagnetic scattering elements are made of amorphous silicon.
3. The device of claim 2, wherein the 4-fold asymmetric electromagnetic scattering elements are 4-fold asymmetric cylinders.
4. The device of claim 3, wherein the 4-fold asymmetric cylinders have a polarization dependent scattering response.
5. The device of claim 4, wherein a major axis of the 4-fold asymmetric cylinders is oriented according to a desired polarization dependent scattering response.
6. The device of claim 5, wherein the 4-fold asymmetric cylinders comprise a first group and a second group of 4-fold asymmetric cylinders, the first group having a major axis oriented in a different direction than a major axis of the second group.
7. The device of claim 4, wherein one or more of a major axis, minor axis, major axis orientation, and height of the 4-fold asymmetric cylinders are configured according to a desired polarization dependent scattering response.
8. The device of claim 4, wherein one or more of a major axis, minor axis, major axis orientation, and height of the 4-fold asymmetric cylinders are configured so that electromagnetic waves incident on the device with a polarization parallel to the major or minor axis have an unchanged polarization but a shifted phase after exiting the device.
9. The device of claim 3, wherein the 4-fold asymmetric cylinders are elliptical, rectangular or rhomboidal.
10. The device of claim 8, wherein the major axis, minor axis, major axis orientation, and height of the 4-fold asymmetric cylinders are determined according to a Jones matrix for the electromagnetic waves incident on and exiting the device.
11. The device of claim 1, wherein a dimension of the 4-fold asymmetric electromagnetic scattering elements is chosen according to an operational wavelength range of the device.
12. A method comprising:
determining a desired polarization and phase shift of an electromagnetic wave scattered by a device, the device comprising a substrate and an array of 4-fold asymmetric electromagnetic scattering elements on the substrate, wherein the electromagnetic scattering elements have a higher refractive index than the substrate;
calculating a Jones matrix for the scattered electromagnetic wave;
determining a major axis, minor axis, height, and orientation of the major axis for each 4-fold asymmetric electromagnetic scattering element, according to the Jones matrix;
fabricating the device according to the major axis, minor axis, height, and orientation of the major axis of each 4-fold asymmetric electromagnetic scattering element.
13. The method of claim 12, wherein the 4-fold asymmetric electromagnetic scattering elements are made of amorphous silicon and the substrate is made of silica.
14. The method of claim 13, wherein the 4-fold asymmetric cylinders are elliptical, rectangular or rhomboidal.
15. A method comprising:
calculating a Jones matrix for an electromagnetic wave scattered by a device, the device comprising a substrate and an array of 4-fold asymmetric electromagnetic scattering elements on the substrate, wherein the electromagnetic scattering elements have a higher refractive index than the substrate;
determining a major axis, minor axis, height, and orientation of the major axis for each 4-fold asymmetric electromagnetic scattering element, according to the Jones matrix;
fabricating the device according to the major axis, minor axis, height, and orientation of the major axis of each 4-fold asymmetric electromagnetic scattering element; and
controlling, by the fabricated device, a polarization and phase shift of the scattered electromagnetic wave.
16. The method of claim 15, wherein the 4-fold asymmetric electromagnetic scattering elements are made of amorphous silicon and the substrate is made of silica.
17. The method of claim 16, wherein the 4-fold asymmetric are elliptical, rectangular or rhomboidal.

18. The device of claim 1, wherein the array of 4-fold asymmetric electromagnetic scattering elements comprises hexagonal regions each having a different phase and polarization profile than adjacent regions.

19. A device comprising:
a substrate; and
an array of 4-fold asymmetric electromagnetic scattering elements on the substrate, wherein:
the 4-fold asymmetric electromagnetic scattering elements have a higher refractive index than the substrate,
the substrate is made of silica and the 4-fold asymmetric electromagnetic scattering elements are made of amorphous silicon,
the 4-fold asymmetric electromagnetic scattering elements are 4-fold asymmetric cylinders,
the 4-fold asymmetric cylinders have a polarization dependent scattering response, and
one or more of a major axis, minor axis, major axis orientation, and height of the 4-fold asymmetric cylinders are configured according to a desired polarization dependent scattering response.

20. A device comprising:
a substrate; and
an array of 4-fold asymmetric electromagnetic scattering elements on the substrate, wherein:
the 4-fold asymmetric electromagnetic scattering elements have a higher refractive index than the substrate,
the substrate is made of silica and the 4-fold asymmetric electromagnetic scattering elements are made of amorphous silicon,
the 4-fold asymmetric electromagnetic scattering elements are 4-fold asymmetric cylinders,
the 4-fold asymmetric cylinders have a polarization dependent scattering response, and one or more of a major axis, minor axis, major axis orientation, and height of the 4-fold asymmetric cylinders are configured so that electromagnetic waves incident on the device with a polarization parallel to the major or minor axis have an unchanged polarization but a shifted phase after exiting the device.

21. The device of claim 20, wherein the major axis, minor axis, major axis orientation, and height of the 4-fold asymmetric cylinders are determined according to a Jones matrix for the electromagnetic waves incident on and exiting the device.

* * * * *